US012701356B2

(12) United States Patent
Jin et al.

(10) Patent No.: US 12,701,356 B2
(45) Date of Patent: Aug. 4, 2026

(54) ELECTRONIC DEVICE AND OPERATION METHOD THEREOF

(71) Applicant: Samsung Electronics Co., Ltd., Suwon-si (KR)

(72) Inventors: Juyeon Jin, Suwon-si (KR); Gupil Cheong, Suwon-si (KR); Sanghyeok Kim, Suwon-si (KR); Doosuk Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 127 days.

(21) Appl. No.: 18/628,196

(22) Filed: Apr. 5, 2024

(65) Prior Publication Data

US 2024/0251203 A1 Jul. 25, 2024

Related U.S. Application Data

(63) Continuation of application No. PCT/KR2022/015744, filed on Oct. 17, 2022.

(30) Foreign Application Priority Data

Nov. 1, 2021 (KR) ........................ 10-2021-0147872

(51) Int. Cl.
*H04R 3/00* (2006.01)
*H04R 5/04* (2006.01)
*H04W 4/80* (2018.01)

(52) U.S. Cl.
CPC ............... *H04R 3/005* (2013.01); *H04R 5/04* (2013.01); *H04W 4/80* (2018.02); *H04R 2420/07* (2013.01)

(58) Field of Classification Search
CPC ........ H04R 3/005; H04R 5/04; H04R 1/1016; H04R 2420/07; H04W 4/80; H04W 52/02;

(Continued)

(56) References Cited

U.S. PATENT DOCUMENTS 7,869,428 B2 1/2011 Shake et al.
8,625,588 B2 1/2014 Shake et al.
(Continued)

FOREIGN PATENT DOCUMENTS

CN 109121042 A 1/2019
CN 113169915 A 7/2021
(Continued)

OTHER PUBLICATIONS

International Search Report dated Feb. 6, 2023, issued in International Patent Application No. PCT/KR2022/015744.

(Continued)

*Primary Examiner* — Yogeshkumar Patel
(74) *Attorney, Agent, or Firm* — Jefferson IP Law, LLP

(57) ABSTRACT

An electronic device is provided. The electronic device includes a microphone, a communication circuit, memory storing one or more computer programs, and one or more processors communicatively coupled to the microphone, the communication circuit, and the memory, wherein the one or more computer programs include computer-executable instructions, when executed by the one or more processors, cause the electronic device to receive an audio data request from a first external electronic device through the communication circuit, generate a first audio packet using audio data acquired through the microphone in the same time period as a second external electronic device connected through the communication circuit, based on a specified condition, insert, into the first audio packet, information for comparing the first audio packet with a second audio packet generated by the second external electronic device in terms of generation order, and transmit the first audio packet to the first external electronic device through the communication circuit.

20 Claims, 11 Drawing Sheets

(58) Field of Classification Search

CPC ......... H04W 52/0209; H04W 52/0216; H04W 52/0219; H04W 52/0222; H04W 76/14; H04W 52/0225; H04W 52/0229; H04W 52/0245; H04W 52/0248; H04W 52/0251; H04W 52/0254; H04W 52/0258; H04W 52/0261; H04W 52/04; H04S 7/30; H03K 19/0016

See application file for complete search history.

(56) References Cited

U.S. PATENT DOCUMENTS

| | | | |
|---|---|---|---|
| 9,980,059 B2 | 5/2018 | Gehring et al. | |
| 10,419,853 B2 | 9/2019 | Hariharan et al. | |
| 10,511,947 B2 | 12/2019 | Seo et al. | |
| 10,853,026 B2 | 12/2020 | Park et al. | |
| 10,932,043 B2 | 2/2021 | Tong et al. | |
| 11,102,565 B1 | 8/2021 | Girardier et al. | |
| 11,153,701 B2 | 10/2021 | Sridharan et al. | |
| 11,551,725 B2 | 1/2023 | Werner et al. | |
| 2011/0038373 A1 | 2/2011 | Shake et al. | |
| 2017/0238103 A1 | 8/2017 | Gehring et al. | |
| 2019/0034161 A1* | 1/2019 | Jo | G06F 3/04842 |
| 2019/0103899 A1* | 4/2019 | Lee | G06F 1/1698 |
| 2019/0166477 A1 | 5/2019 | Seo et al. | |
| 2019/0230459 A1 | 7/2019 | Sridharan et al. | |
| 2019/0261089 A1* | 8/2019 | Hariharan | H04R 1/1091 |
| 2020/0004496 A1 | 1/2020 | Park et al. | |
| 2020/0128620 A1* | 4/2020 | Han | H04W 4/20 |
| 2020/0265854 A1* | 8/2020 | Moon | H04W 4/80 |
| 2020/0265869 A1 | 8/2020 | Werner et al. | |
| 2020/0288292 A1* | 9/2020 | Cheong | H04W 76/15 |
| 2020/0336958 A1 | 10/2020 | Sridhara et al. | |
| 2020/0359134 A1 | 11/2020 | Tong et al. | |
| 2021/0037582 A1* | 2/2021 | Kim | H04W 12/55 |
| 2021/0050960 A1* | 2/2021 | Jang | H04W 4/80 |
| 2021/0142795 A1 | 5/2021 | Yan | |
| 2021/0203454 A1* | 7/2021 | Cheong | H04L 1/1819 |
| 2021/0282207 A1* | 9/2021 | Cheong | H04W 4/80 |
| 2022/0086581 A1 | 3/2022 | Sridharan et al. | |

FOREIGN PATENT DOCUMENTS

| | | | |
|---|---|---|---|
| KR | 10-2017-0062853 A | 6/2017 | |
| KR | 10-2018-0062230 A | 6/2018 | |
| KR | 10-2019-0061438 A | 6/2019 | |
| KR | 10-2021-0096921 A | 8/2021 | |
| WO | 2021/205235 A1 | 10/2021 | |

OTHER PUBLICATIONS

Extended European Search Report dated Dec. 23, 2024, issued in European Patent Application No. 22887448.3.
Korean Office Action dated Jan. 12, 2026, issued in Korean Application No. 10-2021-0147872.

* cited by examiner

500

| CtrData LSB | | | |
|---|---|---|---|
| CIG_ID (1 octet) | CIS_ID (1 octet) | PHY_C_To_P (1 octet) | PHY_P_To_C (1 octet) |

| CtrData (continued) | | | | |
|---|---|---|---|---|
| Max_SDU_C_To_P (12 bits) | RFU (3 bits) | Framed (1 bits) | Max_SDU_P_To_C (12 bits) | RFU (4 bits) |

| CtrData (continued) | | | |
|---|---|---|---|
| SDU_Interval_C_To_P (20 bits) | RFU (4 bits) | SDU_Interval_P_To_C (20 bits) | RFU (4 bits) |

| CtrData (continued) | | | |
|---|---|---|---|
| Max_PDU_C_To_P (2 octets) | Max_PDU_P_To_C (2 octets) | NSE (1 octet) | Sub_Interval (3 octets) |

| CtrData (continued) | | | | |
|---|---|---|---|---|
| BN_C_To_P (4 bits) | BN_P_To_C (4 bits) | FC_C_To_P (1 octet) | FC_P_To_C (1 octet) | ISO_Interval (2 octets) |

| CtrData (continued) MSB | | |
|---|---|---|
| CIS_Offset_Min (3 octets) | CIS_Offset_Max (3 octets) | connEventCount (2 octets) |

FIG.5

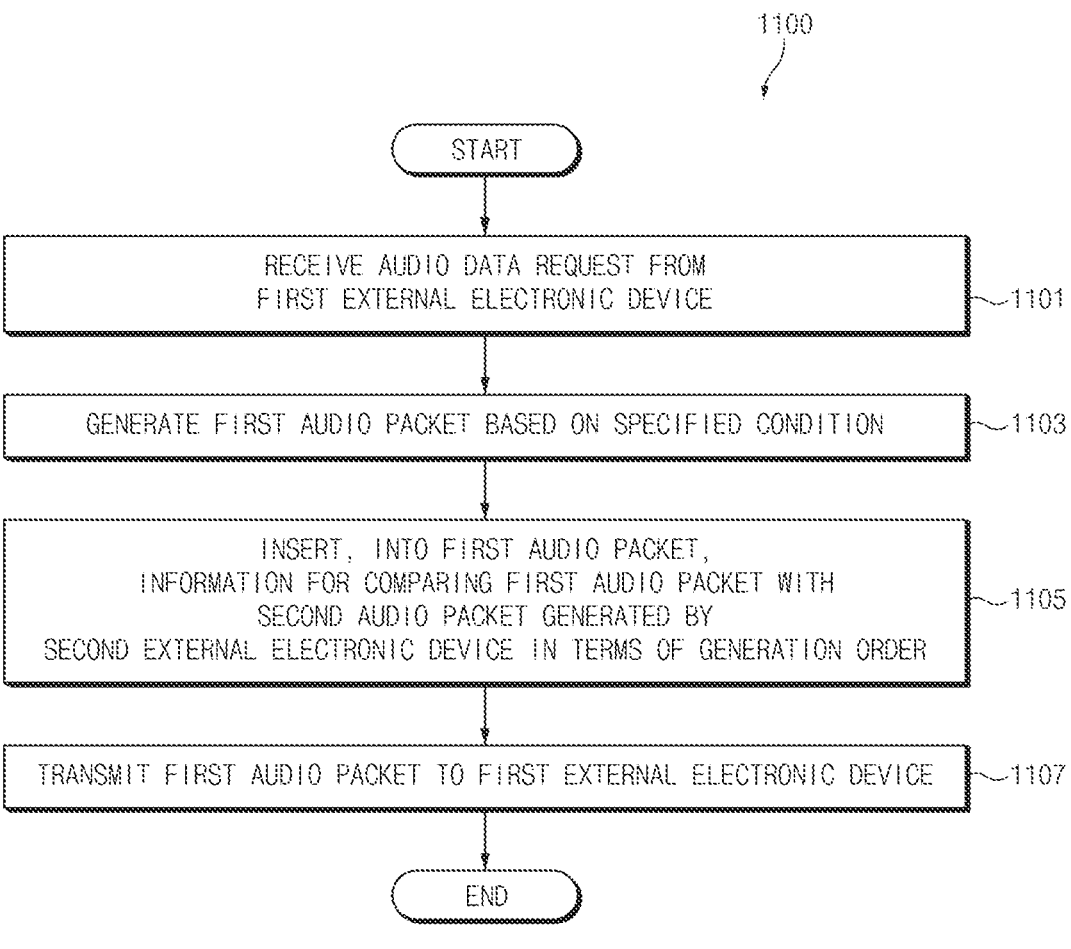

1100

START

RECEIVE AUDIO DATA REQUEST FROM
FIRST EXTERNAL ELECTRONIC DEVICE                ~1101

GENERATE FIRST AUDIO PACKET BASED ON SPECIFIED CONDITION      ~1103

INSERT, INTO FIRST AUDIO PACKET,
INFORMATION FOR COMPARING FIRST AUDIO PACKET WITH
SECOND AUDIO PACKET GENERATED BY                        ~1105
SECOND EXTERNAL ELECTRONIC DEVICE IN TERMS OF GENERATION ORDER

TRANSMIT FIRST AUDIO PACKET TO FIRST EXTERNAL ELECTRONIC DEVICE   ~1107

END

FIG.11

ELECTRONIC DEVICE AND OPERATION METHOD THEREOF

CROSS-REFERENCE TO RELATED APPLICATION(S)

This application is a continuation application, claiming priority under §365(c), of an International application No. PCT/KR2022/015744, filed on Oct. 17, 2022, which is based on and claims the benefit of a Korean patent application number 10-2021-0147872, filed on Nov. 1, 2021, in the Korean Intellectual Property Office, the disclosure of which is incorporated by reference herein in its entirety.

BACKGROUND

1. Field

The disclosure relates to an electronic device that supports audio services based on Bluetooth (BT) or Bluetooth low energy (BLE) communication method and an operation method thereof.

2. Description of Related Art

Electronic devices (e.g., a smartphone, tablet, desktop computer, or laptop computer) may be connected to wireless audio devices (e.g., earphones, a headset, earbuds, or speakers) based on a Bluetooth (BT) or Bluetooth low energy (BLE) communication method. An electronic device may output audio data (e.g., a sound source) through a wireless audio device connected to the electronic device, and may generate a sound source by receiving audio data acquired through a microphone included in the wireless audio device.

The above information is presented as background information only to assist with an understanding of the disclosure. No determination has been made, and no assertion is made, as to whether any of the above might be applicable as prior art with regard to the disclosure.

SUMMARY

As electronic devices that communicate using the Bluetooth or Bluetooth low energy communication method create links with each of other electronic devices, the electronic devices may operate based on the clock of the link. For example, when an electronic device receives data packets (e.g., audio packets) from another electronic device, a delay may occur depending on the reception sensitivity and scheduling of each link. Even when data packets are generated in the same time period in each electronic device, the data packets may not be received at the same receive timing. Additionally, even when data packets received from each electronic device are received at the same receive timing, the packets may not be generated in the same time period. For example, when data packets received from different electronic devices are merged based on the order or time in which the data packets are received, the data packets may be out of sync.

Aspects of the disclosure are to address at least the above-mentioned problems and/or disadvantages and to provide at least the advantages described below. Accordingly, an aspect of the disclosure is to provide an electronic device that allows an electronic device receiving data packets from a plurality of different electronic devices to identify data packets generated in the same time period in the plurality of electronic devices, and an operation method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a microphone, a communication circuit, memory storing one or more computer programs, and one or more processors communicatively coupled to the microphone, the communication circuit, and the memory, wherein the one or more computer programs include computer-executable instructions, when executed by the one or more processors, cause the electronic device to receive an audio data request from a first external electronic device through the communication circuit, generate a first audio packet using audio data acquired through the microphone in the same time period as a second external electronic device connected through the communication circuit, based on a specified condition, insert, into the first audio packet, information for comparing the first audio packet with a second audio packet generated by the second external electronic device in terms of generation order, and transmit the first audio packet to the first external electronic device through the communication circuit.

In accordance with another aspect of the disclosure, a method of operating an electronic device is provided. The method includes receiving an audio data request from a first external electronic device through a communication circuit, generating a first audio packet using audio data acquired through a microphone in the same time period as a second external electronic device connected through the communication circuit, based on a specified condition, inserting, into the first audio packet, information for comparing the first audio packet with a second audio packet generated by the second external electronic device in terms of generation order, and transmitting the first audio packet to the first external electronic device through the communication circuit.

In accordance with another aspect of the disclosure, one or more non-transitory computer-readable storage media storing one or more computer programs including computer-executable instructions that, when executed by one or more processors of an electronic device, cause the electronic device to perform operations are provided. The operations include receiving an audio data request from a first external electronic device through a communication circuit, generating a first audio packet using audio data acquired through a microphone in the same time period as a second external electronic device connected through the communication circuit, based on a specified condition, inserting, into the first audio packet, information for comparing the first audio packet with a second audio packet generated by the second external electronic device in terms of generation order, and transmitting the first audio packet to the first external electronic device through the communication circuit.

According to various embodiments disclosed herein, it is possible to provide an electronic device that allows an electronic device receiving data packets from a plurality of different electronic devices to identify data packets generated in the same time period in the plurality of electronic devices, and an operation method thereof.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a diagram illustrating one example of parameters of a connected isochronous stream (CIS) according to an embodiment of the disclosure;

FIG. 11 is a flowchart illustrating operations of an electronic device according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
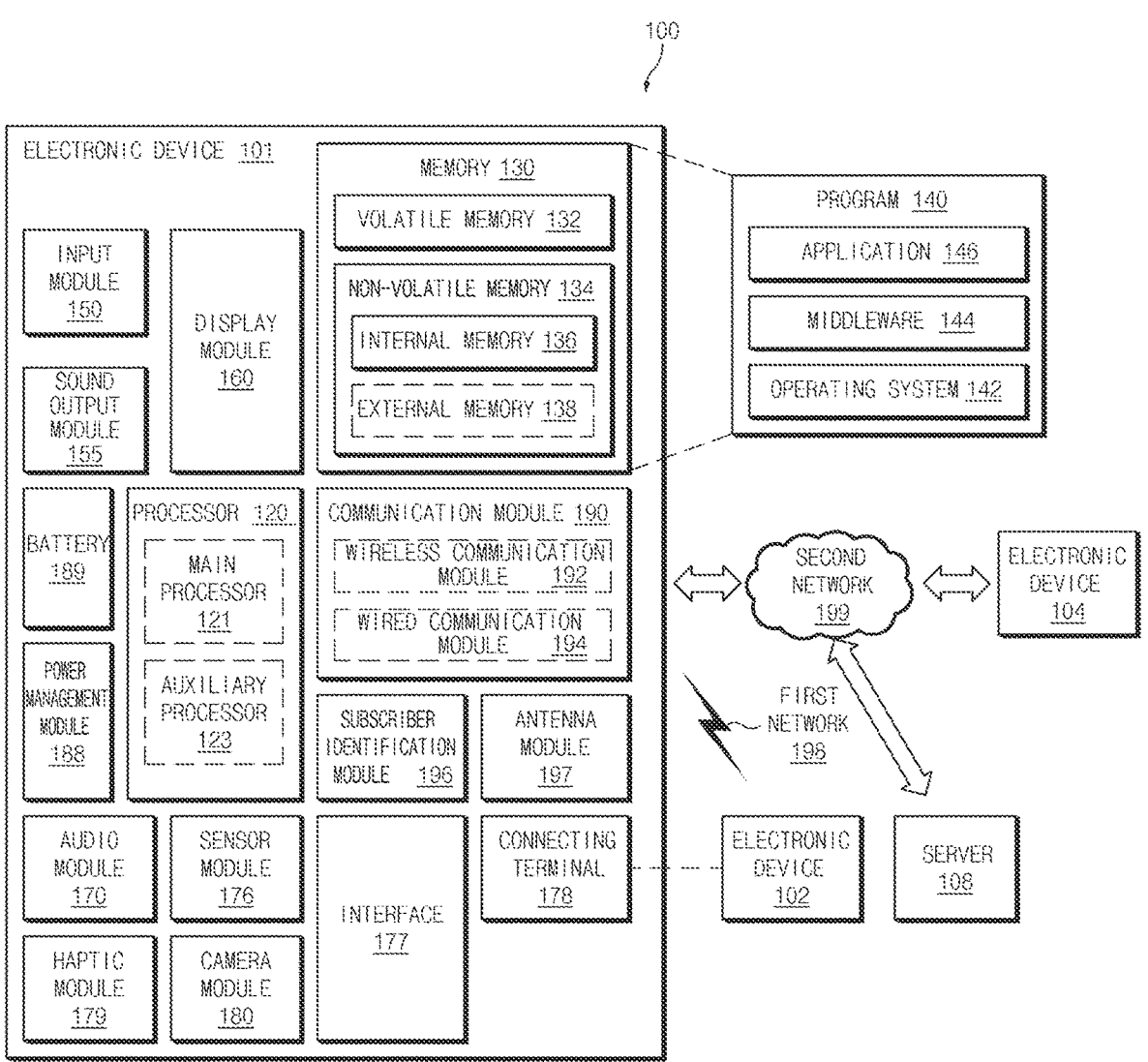
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). In an embodiment, the electronic device 101 may communicate with the electronic device 104 via the server 108. According to another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In other embodiments, some of the components (e.g., the sensor module 176, the camera module 180, or the antenna module 197) may be implemented as a single component (e.g., the display module 160).

The processor 120 may be configured to execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. In an example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). In an embodiment, the auxiliary processor 123 (e.g., an image signal processor or a communication processor) may be implemented as part of another component (e.g., the camera module 180 or the communication module 190) functionally related to the auxiliary processor 123. According to another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may additionally or alternatively, include a software structure other than the hardware structure.

The memory 130 may be configured to store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may for example, receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to another embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. In an embodiment, the display module 160 may include a touch sensor adapted to detect a touch, or a pressure sensor adapted to measure the intensity of force incurred by the touch.

The audio module 170 may convert a sound into an electrical signal and vice versa. According to another embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. In an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). In an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to another embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. According to another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. In an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may for example, communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may for example, support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. In an embodiment, the antenna module 197 may include an antenna including a radiating element composed of a conductive material or a conductive pattern formed in or on a substrate (e.g., a printed circuit board (PCB)). In another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

According to various embodiments, the antenna module 197 may form a mmWave antenna module. In an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. According to one embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may for example, provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). In an example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to other embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to still other embodiments, operations performed by the module, the program, or another component may be carried out sequentially, in parallel, repeatedly, or heuristically, or one or more of the operations may be executed in a different order or omitted, or one or more other operations may be added.

Hereinafter, a communication environment of an electronic device according to one embodiment will be described with reference to FIG. 2.

Figure 2:
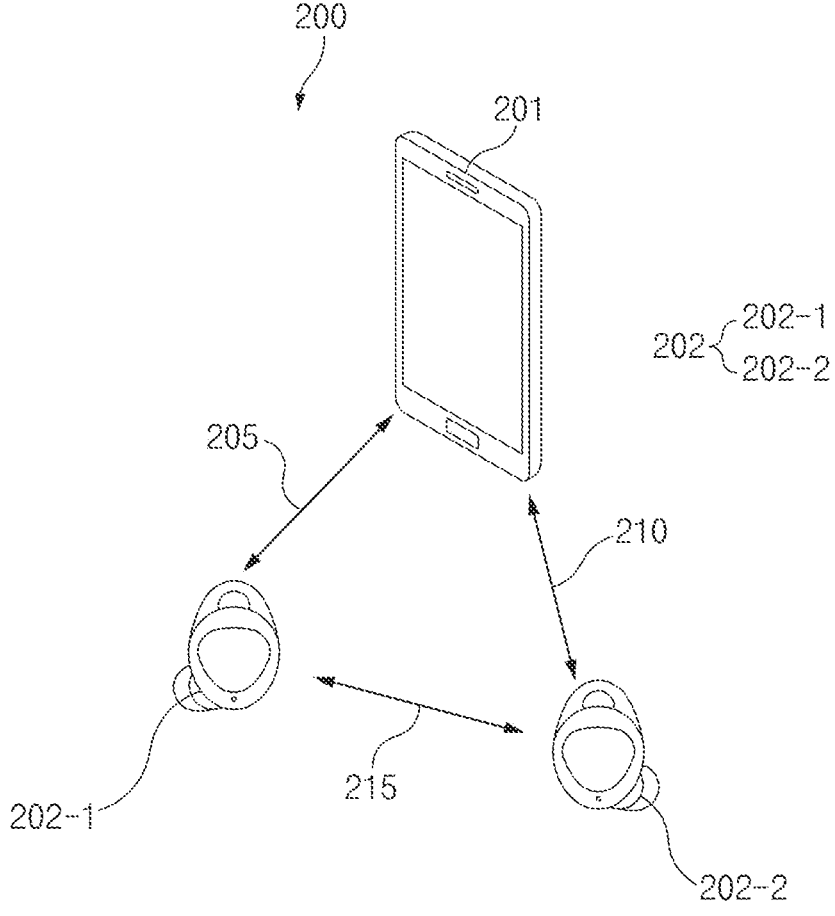
FIG. 2 is a diagram illustrating a communication environment of an electronic device according to an embodiment of the disclosure.

FIG. 2 is a diagram 200 illustrating a communication environment of an electronic device according to an embodiment of the disclosure.

Referring to FIG. 2, a first electronic device 201, a second electronic device 202-1, and a third electronic device 202-2 maybe communicatively connected to each other. The first electronic device 201, the second electronic device 202-1, and the third electronic device 202-2 may have the same or similar components as at least some of the components of an electronic device 101 illustrated in FIG. 1, and perform the same or similar functions as at least some of the functions of the electronic device 101. The first electronic device 201 may include, for example, a smartphone, tablet, desktop computer, or laptop computer. The second electronic device 202-1 and the third electronic device 202-2 are wireless audio devices 202 and may include, for example, earphones, headsets, earbuds, or speakers. For example, the second electronic device 202-1 and the third electronic device 202-2 may be true wireless stereo (TWS).

In an embodiment, the first electronic device 201, the second electronic device 202-1, and the third electronic device 202-2 may perform short-distance wireless communication through a Bluetooth network defined by a Bluetooth™ special interest group (SIG). The Bluetooth network may include, for example, a Bluetooth classic, or a Bluetooth low energy (BLE) network. According to another embodiment, the first electronic device 201, the second electronic device 202-1, and the third electronic device 202-2 may perform wireless communication through a Bluetooth classic network or a BLE network.

The first electronic device 201 may be a central (or master) device, and the second electronic device 202-1 and the third electronic device 202-2 may be a peripheral (or slave) device. The number of peripheral devices is not limited to the example illustrated in FIG. 2. According to another embodiment, the central device and the peripheral device may be determined in an operation in which links (e.g., a first link 205, a second link 210, and/or a third link 215) are created among the first electronic device 201, the second electronic device 202-1, and the third electronic device 202-2. A link may be referred to, for example, as a communication link. According to still another embodiment, one of the second electronic device 202-1 and the third electronic device 202-2 may be a central device, and the other device may be a peripheral device.

According to an embodiment, the first electronic device 201 may create or establish a communication link with the second electronic device 202-1 and/or the third electronic device 202-2. For example, the first electronic device 201 may establish a communication link (e.g., the first link 205) with the second electronic device 202-1 and/or a communication link (e.g., the second link 210) with the third electronic device 202-2 based on the Bluetooth legacy protocol or BLE protocol. The first electronic device 201 may communicate with the second electronic device 202-1 through the first link 205, and may communicate with the third electronic device 202-2 through the second link 210.

According to another embodiment, the second electronic device 202-1 and the third electronic device 202-2 may create or establish a communication link connecting them. For example, the second electronic device 202-1 may establish a communication link (e.g., the third link 215) with the third electronic device 202-2 based on the Bluetooth legacy protocol or BLE protocol. The second electronic device 202-1 may communicate with the third electronic device 202-2 through the third link 215.

According to one embodiment, the first electronic device 201 and the wireless audio device 202 may transmit and receive a data packet including audio content. For example, the data packet including audio content may be referred to as an audio packet. In another example, when music is played on the first electronic device 201, the first electronic device 201 may transmit an audio packet corresponding to the played music to the second electronic device 202-1 and/or the third electronic device 202-2 through the first link 205 and/or the second link 210. In yet another example, when binaural recording is performed in the first electronic device 201, the first electronic device 201 may transmit an audio data request to the second electronic device 202-1 and/or the third electronic device 202-2 through the first link 205 and/or the second link 210, and the second electronic device 202-1 and/or the third electronic device 202-2 may generate an audio packet using audio data input (or acquired) through microphones of the second electronic device 202-1 and/or the third electronic device 202-2 in response to the audio data request and transmit the generated audio packet through the first link 205 and/or the second link 210.

The second electronic device 202-1 may be referred to as an "electronic device," the first electronic device 201 may be referred to as a "first external electronic device," and the third electronic device 202-2 maybe referred to as a "second external electronic device". According to another embodiment, the third electronic device 202-2 maybe referred to as an "electronic device," the first electronic device 201 may be referred to as a "first external electronic device," and the second electronic device 202-1 maybe referred to as a "second external electronic device".

A configuration and operation of an electronic device and external electronic devices according to one embodiment will be described with reference to FIG. 3.

Figure 3:
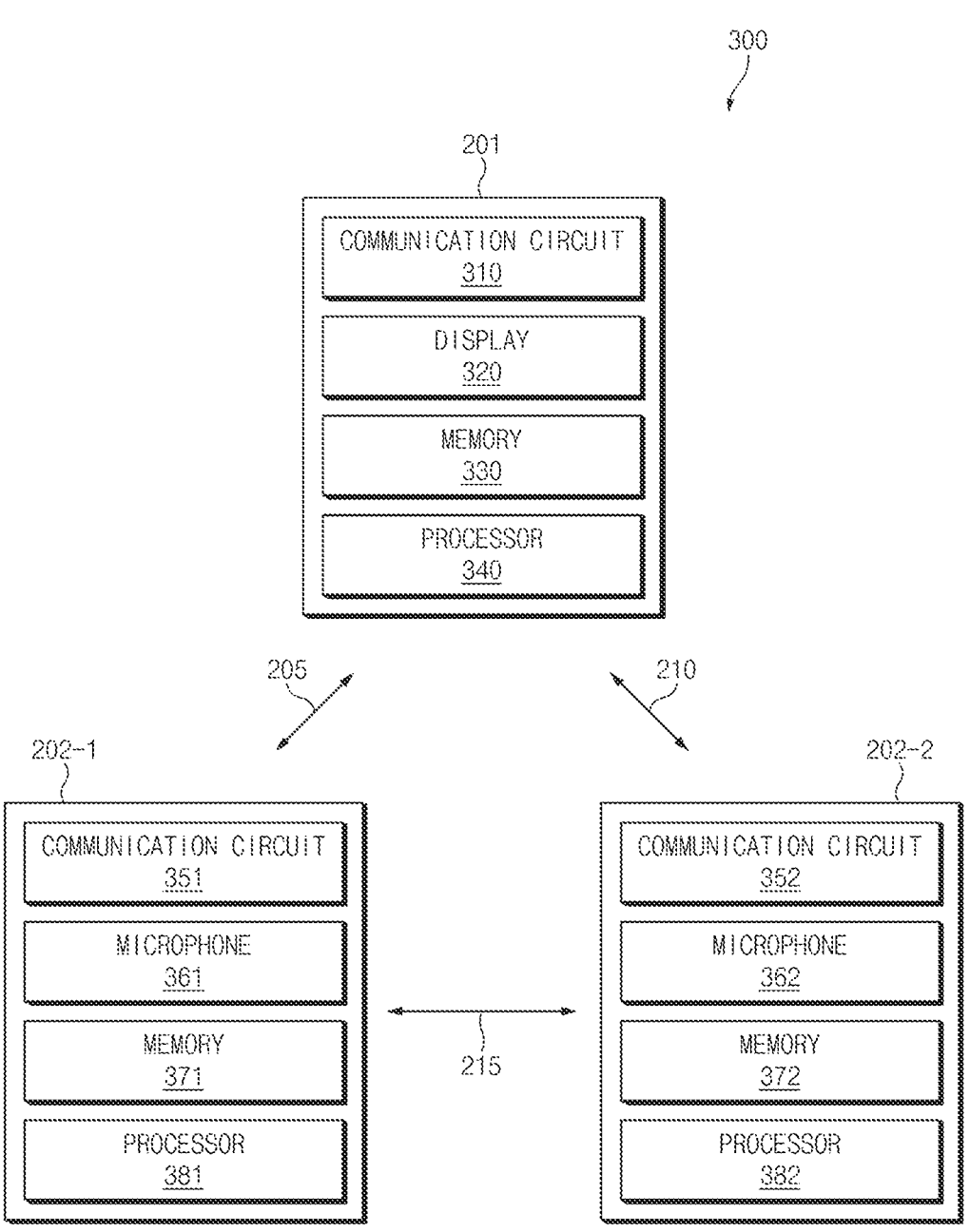
FIG. 3 is a block diagram illustrating an electronic device and external electronic devices according to an embodiment of the disclosure.

FIG. 3 is a block diagram 300 illustrating an electronic device and external electronic devices according to an embodiment of the disclosure.

According to one embodiment, a first external electronic device 201 may include a communication circuit 310 (e.g., a communication module 190 in FIG. 1), a display 320 (a display module 160 in FIG. 1), memory 330 (e.g., memory 130 in FIG. 1), and a processor 340 (e.g., a processor 120 in FIG. 1). The processor 340 may be operatively connected to the communication circuit 310, the display 320, and the memory 330. The memory 330 may store one or more instructions that, when executed, cause the processor 340 to perform various operations of the first external electronic device 201.

The communication circuit 310 may be configured to support wireless communication based on a Bluetooth protocol (e.g., Bluetooth legacy and/or BLE). According to an embodiment, the first external electronic device 201 may communicate with the electronic device 202-1 through a first link 205. According to another embodiment, the first external electronic device 201 may communicate with the second external electronic device 202-2 through a second link 210. For example, the first external electronic device 201 may establish the first link 205 with the electronic device 202-1 and then establish the second link 210 with the second external electronic device 202-2.

The display 320 may output a user interface for connecting the first external electronic device 201 and the electronic device 202-1 and/or the second external electronic device 202-2.

According to various embodiments, the first external electronic device 201 may further include other components not illustrated in FIG. 3. In an example, the first external electronic device 201 may further include an audio input/output device (e.g., the audio module 170) and/or a camera module (e.g., the camera module 180 in FIG. 1).

The electronic device 202-1 may include a communication circuit 351 (e.g., the communication module 190 in FIG. 1), a microphone 361 (e.g., the input module 150 in FIG. 1), memory 371 (e.g., the memory 130 in FIG. 1), and a processor 381 (e.g., the processor 120 in FIG. 1). The processor 381 may be operatively connected to the communication circuit 351, the microphone 361, and the memory 371. The memory 371 may for example, store one or more instructions that, when executed, cause the processor 381 to perform various operations of the electronic device 202-1.

According to one embodiment, the communication circuit 351 may be configured to support wireless communication based on a Bluetooth protocol (e.g., Bluetooth legacy and/or BLE). According to another embodiment, the electronic device 202-1 may communicate with the first external electronic device 201 through the first link 205.

For example, the electronic device 202-1 may generate an advertising signal using a multicast or broadcast method. The advertising signal may be a signal that transmits information (e.g., information related to pairing) related to a connection or account to an unspecified nearby external electronic device (e.g., the first external electronic device 201) using wireless communication (e.g., BLE communication). In another example, the advertising signal may include at least one of identification information about the electronic device 202-1 (hereinafter referred to as "device identification information"), a user's account information (hereinafter referred to as "user account information"), information regarding whether or not the device is currently paired with another device (hereinafter "referred to as current pairing information"), a list of previously paired devices (hereinafter referred to as a "pairing list"), information regarding devices capable of being simultaneously paired (hereinafter referred to as "simultaneous pairing information"), information regarding transmit (Tx) power, a detection area, a remaining battery capacity (hereinafter referred to as "battery state information"), or an audio channel role (e.g., left or right). For example, the electronic device 202-1 and/or the second external electronic device 202-2 maybe stored in a case (or cradle (not illustrated)), and when the case is opened in a state in which the electronic device 202-1 is stored in the case, or the electronic device 202-1 is separated from the case, the electronic device 202-1 may generate the advertising signal. The electronic device 202-1 may generate the advertising signal according to a specified condition. For example, the electronic device 202-1 may output the advertising signal based on at least one of power supply, a specified time period, or a user input.

As the first external electronic device 201 receives the advertising signal generated by the electronic device 202-1, the first external electronic device 201 may output a user interface for connection with the electronic device 202-1 on a display (e.g., the display 320). The first external electronic device 201 may output various user interfaces based on information included in the advertising signal. In an example, the user interface may include an image corresponding to the electronic device 202-1 connected to the first external electronic device 201. For example, the user interface may include device recognition information. For another example, device recognition information may include the device identification information and the battery state information. For example, the device recognition information may include information indicating whether or not the first external electronic device 201 has been previously paired with the electronic device 202-1. Device recognition information may be displayed based on user account.

The electronic device 202-1 may communicate with the second external electronic device 202-2 through a third link 215. For example, the electronic device 202-1 may establish the third link 215 using the Bluetooth legacy method or BLE method in the same or similar manner as the method of creating or establishing the first link 205. The electronic device 202-1 may establish the third link 215 with the second external electronic device 202-2 before or after the first link 205 and/or the second link 210 is established. For example, the electronic device 202-1 and the second external electronic device 202-2 may establish the third link 215 as they are separated from the cradle (not illustrated).

According to one embodiment, the electronic device 202-1 may receive an audio data request from the first external electronic device 201 through the first link 205. For example, the first external electronic device 201 may transmit the audio data request through the first link 205 and/or the second link 210 as it starts binaural recording. According to another embodiment, the audio data request may include a request for audio data generated by the electronic device 202-1 and the second external electronic device 202-2 in the same time period. Binaural recording, for example, may include technology for simultaneously storing image data or video data acquired through a camera (not illustrated) of the first external electronic device 201 or audio data acquired through microphones (e.g., the microphone 361 and a microphone 362) of the electronic device 202-1 and/or the second external electronic device 202-2. In an example, as the first external electronic device 201 starts recording the surrounding environment on video and audio, the first external electronic device 201 may activate a camera (not illustrated) of the first external electronic device 201 and request audio data generated in the same time period from the electronic device 202-1 and/or the second external electronic device 202-2 connected to the first external electronic device 201. When the first external electronic device 201 starts recording on video and audio based on a user's input, upon identifying that there is an electronic device (e.g., the electronic device 202-1 and/or the second external electronic device 202-2) connected to the first external electronic device 201 and the connected electronic device is a device including a microphone (e.g., the microphone 361 or the microphone 362), the first external electronic device 201 may notify a user that two or more recordings are possible through the user interface (UI) and/or user experience (XU).

The microphone 361 may collect sounds from outside the electronic device 202-1 and generate (or acquire) audio data. According to an embodiment, as the electronic device 202-1 receives the audio data request from the first external electronic device 201, the electronic device 202-1 may generate an audio packet using the audio data acquired through the microphone 361. For example, the audio packet may mean a unit (or bundle) in which the electronic device 202-1 transmits audio data to the first external electronic device 201. For example, the electronic device 202-1 may receive, from the first external electronic device 201, an audio data request requiring an isochronous (or the same time period) property with another electronic device (e.g., the second external electronic device 202-2) connected to the first external electronic device 201. As the electronic device 202-1 receives the audio data request requiring the isochronous property, the electronic device 202-1 may generate an audio packet using audio data acquired through the microphone 361 in the same time period as the second external electronic device 202-2.

According to one embodiment, the electronic device 202-1 may generate an audio packet using audio data acquired through the microphone 361 in the same time period as the second external electronic device 202-2 based on a specified condition. According to another embodiment, the specified condition may be applied identically or similarly to the second external electronic device 202-2. For example, the second external electronic device 202-2 may generate an audio packet using audio data acquired through the microphone 362 in the same time period as the electronic device 202-1 based on the specified condition.

The specified condition may include a specified time according to a clock of a central device (or the first external electronic device 201) of a communication link (e.g., the first link 205) between the electronic device 202-1 and the first external electronic device 201. In an embodiment, the specified condition for the second external electronic device 202-2 to generate the audio packet may include a specified time according to a clock of a central device (or the first external electronic device 201) of a communication link (e.g., the second link 210) between the second external electronic device 202-2 and the first external electronic device 201. For example, the specified time may include the time from a specified first point in time to a specified second point in time based on the clock of the first external electronic device 201. According to another embodiment, the second point in time may be later than the first point in time. For example, the electronic device 202-1 may generate a first audio packet using audio data acquired through the microphone 361 from the specified first point in time to the specified second point in time based on the clock of the first external electronic device 201. The second external electronic device 202-2 may generate a second audio packet using audio data acquired through the microphone 362 from the specified first point in time to the specified second point in time based on the clock of the first external electronic device 201.

According to various embodiments, the specified condition may include a specified time according to an event count or reference clock of a communication link (e.g., the third link 215) between the electronic device 202-1 and the second external electronic device 202-2.

The event count of the communication link (e.g., the third link 215) between the electronic device 202-1 and the second external electronic device 202-2 is a value that increases as an event related to data transmission and reception of the electronic device 202-1 and the second external electronic device 202-2 occurs at a specified period, and the electronic device 202-1 and the second external electronic device 202-2 may have the same event count value. For example, the event count may increase by one every specified period. For example, the specified time may include a time from a specified first point in time to a specified second point in time based on the event count of the third link 215. The point in time specified based on the event count of the third link 215 may include a point in time when the event count is a specified value or a point in time when the event count is changed (e.g., increased). For example, the electronic device 202-1 may generate the first audio packet using audio data acquired through the microphone 361 from the specified first point in time to the specified second point in time based on the event count of the third link 215. The second external electronic device 202-2 may generate the second audio packet using audio data acquired through the microphone 362 from the specified first point in time to the specified second point in time based on the event count of the third link 215.

The reference clock of the communication link (e.g., third link 215) between the electronic device 202-1 and the second external electronic device 202-2 may include a clock of a central device among the electronic device 202-1 and the second external electronic device 202-2, or a clock synchronized between the electronic device 202-1 and the second external electronic device 202-2. For example, the electronic device 202-1 may generate the first audio packet using audio data acquired through the microphone 361 from a specified first point in time to a specified second point in time based on the reference clock of the third link 215. In an example, the second external electronic device 202-2 may generate the second audio packet using audio data acquired through the microphone 362 from the specified first point in time to the specified second point in time based on the reference clock of the third link 215.

According to various embodiments, the specified condition may include a specified time according to an event count or timing parameter associated with isochronous data transmission between the electronic device 202-1 and the first external electronic device 201. In one embodiment, the electronic device 202-1 and the second external electronic device 202-2 may perform isochronous data transmission with the first external electronic device 201. For example, the electronic device 202-1 and the second external electronic device 202-2 may perform isochronous data transmission based on a connected isochronous stream (CIS). The CIS means logical transmission for transmitting isochronous data in any direction between electronic devices with an established communication link based on the Bluetooth protocol.

The first external electronic device 201 may generate a connected isochronous group (CIG). The connected isochronous group (CIG) may have the same ISO_Interval and include two or more CISs expected to have a temporal relationship at an application layer or within a single CIS. The ISO_Interval means the time interval between anchor points of adjacent CIS events. Within the same CIG event, a plurality of CISs may not have the same CIS event count (e.g., cisEventCounter) value, and it is sufficient if the difference between the plurality of CIS event count values is the same. All CISs in the CIG have the same central device but may have different peripheral devices. The plurality of CISs included in the CIG may have a common timing reference based on the timing of the central device and may be synchronized in a common time unit.

For example, the CIG generated by the first external electronic device 201 may include a CIS (CIS1) between the electronic device 202-1 and the first external electronic device 201 and a CIS (CIS2) between the second external electronic device 202-2 and the first external electronic device 201. For another example, in the CIG generated by the first external electronic device 201, the first external electronic device 201 may be a central device, and the electronic device 202-1 and the second external electronic device 202-2 maybe peripheral devices. For example, an event and a parameter related to isochronous data transmission between the electronic device 202-1 and the first external electronic device 201, and/or the second external electronic device 202-2 and the first external electronic device 201 may be determined by the first external electronic device 201, which is the central device. The first external electronic device 201 may determine a occurrence point in time or occurrence period of an event (e.g., a CIS event and/or a CIG event) related to isochronous data transmission with the electronic device 202-1 and/or the second external electronic device 202-2. For example, the first external electronic device 201 may determine a synchronization time point or synchronization period related to isochronous data transmission with the electronic device 202-1 and the second external electronic device 202-2. The parameter related to isochronous data transmission may include a timing parameter. The timing parameter may include, for example, a parameter (e.g., CIS_Sync_Delay and/or CIG_Sync_Delay) related to the synchronization time point of a plurality of CISs included in the CIG.

The event count associated with isochronous data transmission between the electronic device 202-1 and the first external electronic device 201 may be a value that increases as an event (e.g., a CIS event and/or CIG event) associated with isochronous data transmission between the electronic device 202-1 and the first external electronic device 201 occurs at a specified period. According to the above, within the same CIG event, a difference d between the event count (e.g., cisEventCounter_1) value of the CIS (CIS1) between the electronic device 202-1 and the first external electronic device 201 and the event count (e.g., cisEventCounter_2) value of the CIS (CIS2) between the second external electronic device 202-2 and the first external electronic device 201 is the same. For example, the difference d in event count values of CISs within the same CIG event may be a value known to the first external electronic device 201, which is a central device. For another example, the first external electronic device 201 may know the event count (e.g., cisEventCounter_2=cisEventCounter_1+d) of the CIS (CIS2) between the second external electronic device 202-2 and the first external electronic device 201, which corresponds to the event count (e.g., cisEventCounter_1) of the CIS (CIS1) between the electronic device 202-1 and the first external electronic device 201. For example, the electronic device 202-1 and the second external electronic device 202-2 may determine the same time period based on the event count of CIS1 (e.g., cisEventCounter_1) and/or the event count of CIS2 (e.g., cisEventCounter_2).

The specified time according to the event count related to isochronous data transmission between the electronic device 202-1 and the first external electronic device 201 may include a time from a specified first point in time to a specified second point in time based on the event count of CIS1. For example, the point in time specified based on the event count of CIS1 may include a point in time when the event count is a specified value or a point in time when the event count is changed (e.g., increased). The electronic device 202-1 may generate the first audio packet using audio data acquired through the microphone 361 from the specified first point in time to the specified second point in time based on the event count of CIS1. For example, the second external electronic device 202-2 may generate the second audio packet using audio data acquired through the microphone 362 from the specified first point in time to the specified second point in time based on the event count of CIS2 corresponding to the event count of CIS1.

For an example, a timing parameter related to isochronous data transmission between the electronic device 202-1 and the first external electronic device 201 may be a parameter (e.g., CIS_Sync_Delay and/or CIG_Sync_Delay) related to a synchronization time point of the CIG including CIS (CIS1) between the electronic device 202-1 and the first external electronic device 201. For example, the parameter related to the synchronization time point of the CIG, including the CIS (CIS1) between the electronic device 202-1 and the first external electronic device 201 and the CIS (CIS2) between the second external electronic device 202-2 and the first external electronic device 201, may be determined by the first external electronic device 201 and may be equally applied to the electronic device 202-1 and the second external electronic device 202-2. For another example, the specified time according to the timing parameter related to isochronous data transmission between the electronic device 202-1 and the first external electronic device 201 may include a time from a specified first point in time to a specified second point in time based on the timing parameter of the CIG including CIS1 and CIS2. For example, the electronic device 202-1 may generate the first audio packet using audio data acquired through the microphone 361 from the specified first point in time to the specified second point in time based on the timing parameter of the CIG including CIS1 and CIS2. The second external electronic device 202-2 may generate the second audio packet using audio data acquired through the microphone 362 from the specified first point in time to the specified second point in time based on the timing parameter of the CIG including CIS1 and CIS2.

The electronic device 202-1 may generate the first audio packet using audio data acquired through the microphone 361 from the specified first point in time to the specified second point in time according to the specified condition, and the second external electronic device 202-2 may generate the second audio packet using audio data acquired through the microphone 362 from the specified first point in time to the specified second point in time according to the specified condition. In an example, the electronic device 202-1 and the second external electronic device 202-2 may generate the first audio packet and the second audio packet, respectively, using the audio data acquired through the respective microphones (e.g., the microphone 361 and the microphone 362) in the same time period.

According to an embodiment, the electronic device 202-1 may insert, into the first audio packet, information for comparing the first audio packet with the second audio packet generated by the second external electronic device 202-2 in terms of generation order. The information for comparing the first audio packet with the second audio packet generated by the second external electronic device 202-2 in terms of generation order may include information about the time and order in which the electronic device 202-1 generates the first audio packet, or the time and order in which the electronic device 202-1 acquires audio data corresponding to the first audio packet. For example, the electronic device 202-1 may insert time information including at least one of the specified first point in time or the specified second point in time and order information corresponding to the time information into the first audio packet. According to another embodiment, the second external electronic device 202-2 may insert time information including at least one of the specified first point in time or the specified second point in time and order information corresponding to the time information into the second audio packet. For example, the same time information and the same order information may be inserted into the first audio packet and the second audio packet.

The electronic device 202-1 may acquire a plurality of first audio packets by generating the first audio packet at a period specified according to a specified condition. For example, the electronic device 202-1 may generate the first audio packet according to a specified period based on the clock of the first external electronic device 201. For another example, the electronic device 202-1 may generate the first audio packet whenever the event count of the third link 215 increases, or according to a specified period based on the reference clock of the third link 215. For yet another example, the electronic device 202-1 may generate the first audio packet whenever the event count of CIS1 (e.g., cisEventCounter_1) increases, or according to a synchronization period according to the timing parameter of the CIG including CIS1 and CIS2.

The electronic device 202-1 may insert time information and order information into each of a plurality of first audio packets. For example, the electronic device 202-1 may insert, into each of the plurality of first audio packets, time information including at least one of the specified first point in time or the specified second point in time, which are related to acquisition of audio data corresponding to each of the plurality of first audio packets. For example, the electronic device 202-1 may insert, into the plurality of first audio packets, order information including a larger number as the point in time (e.g., the specified first point in time or the specified second point in time) included in the time information of each of the plurality of first audio packets becomes later.

According to an embodiment, the electronic device 202-1 may insert order information into each of the plurality of first audio packets. According to various embodiments, the electronic device 202-1 may insert the order information into only one of one or more first audio packets having time information with the same specified time unit (e.g., seconds (sec)) among the plurality of first audio packets. For example, a case may be assumed that the plurality of first audio packets generated by the electronic device 202-1 include packet A, packet B, packet C, and packet D, the time information of packet A is 31.00 seconds, the time information of packet B is 31.50 seconds, the time information of packet C is 32.00 seconds, the time information of packet D is 32.50, and the electronic device 202-1 inserts the order information in seconds (sec). The electronic device 202-1 may insert order information into only one of packet A and packet B, and insert order information into only one of packet C and packet D. The order information inserted into packet C or packet D may include a number larger than the number included in the order information inserted into packet A or packet B. According to various embodiments, the electronic device 202-1 may insert the order information into only one of a specified number (e.g., two) of consecutive audio packets among the plurality of first audio packets. For example, the electronic device 202-1 may insert the order information once per specified number (e.g., two). When the plurality of first audio packets generated by the electronic device 202-1 include packet A, packet B, packet C, and packet D and the time information of packets is delayed in the order of packet A, packet B, packet C, and packet D, the electronic device 202-1 may insert order information into packet A and packet C, or insert order information into packet B and packet D. The order information inserted into packet C or packet D may include a number larger than the number included in the order information inserted into packet A or packet B. According to various embodiments, the electronic device 202-1 may further include other components not illustrated in FIG. 3. The electronic device 202-1 may further include a speaker (e.g., the sound output module 155 in FIG. 1) and/or a sensor (e.g., the sensor module 176 in FIG. 1).

In an embodiment, the second external electronic device 202-2 may include a communication circuit 352 (e.g., the communication module 190 in FIG. 1), a microphone 362 (e.g., the input module 150 in FIG. 1), memory 372 (e.g., the memory 130 in FIG. 1), and a processor 382 (e.g., the processor 120 in FIG. 1). The processor 382 may be operatively connected to the communication circuit 352, the microphone 362, and the memory 372. The memory 372 may store one or more instructions that, when executed, cause the processor 382 to perform various operations of the electronic device 202-1. In an example, the second external electronic device 202-2 may be referred to as a peer electronic device of the electronic device 202-1. The operations of the second external electronic device 202-2 to be described below may be performed the same or similar to the operations performed by the electronic device 202-1 described above.

According to one embodiment, the communication circuit 352 may be configured to support wireless communication based on a Bluetooth protocol (e.g., Bluetooth legacy and/or BLE). According to another embodiment, the second external electronic device 202-2 may communicate with the first external electronic device 201 through the second link 210. For example, the second external electronic device 202-2 may establish the second link 210 with the first electronic device 201 after establishment of the first link 205 between the first external electronic device 201 and the electronic device 202-1. According to yet another embodiment, the second external electronic device 202-2 and the first external electronic device 201 may create or establish the second link 210 in the same or similar manner in which the electronic device 202-1 and the first external electronic device 201 create or establish the first link 205.

The second external electronic device 202-2 may communicate with the electronic device 202-1 through a third link 215. For example, the second external electronic device 202-2 may establish the third link 215 using the Bluetooth legacy method or BLE method in the same or similar manner as the method of creating or establishing the first link 205 or the second link 210. For example, the second external electronic device 202-2 may establish the third link 215 with the electronic device 202-1 before or after the first link 205 and/or the second link 210 is established. The second external electronic device 202-2 and the electronic device 202-1 may establish the third link 215 as they are separated from the cradle (not illustrated).

In an embodiment, the second external electronic device 202-2 may receive an audio data request from the first external electronic device 201 through the second link 210. For example, the audio data request may be transmitted through the second link 210 as the first external electronic device 201 starts binaural recording. In another embodiment, the audio data request may include a request for audio data generated by the electronic device 202-1 and the second external electronic device 202-2 in the same time period.

According to an embodiment, the microphone 362 may collect sounds from outside the second external electronic device 202-2 and generate (or acquire) audio data. According to another embodiment, as the second external electronic device 202-2 receives the audio data request from the first external electronic device 201, the second external electronic device 202-2 may generate an audio packet using the audio data acquired through the microphone 362. For example, the second external electronic device 202-2 may receive, from the first external electronic device 201, an audio data request requiring an isochronous (or the same time period) property with another electronic device (e.g., the electronic device 202-1) connected to the first external electronic device 201. As the second external electronic device 202-2 receives the audio data request requiring the isochronous property, the second external electronic device 202-2 may generate an audio packet using audio data acquired through the microphone 362 in the same time period as the electronic device 202-1.

The second external electronic device 202-2 may generate an audio packet using audio data acquired through the microphone 362 in the same time period as the electronic device 202-1 based on a specified condition. According to one embodiment, the specified condition may be the same or similar to an audio packet generation condition of the electronic device 202-1.

In an embodiment, the specified condition may include a specified time according to a clock of a central device (or the first external electronic device 201) of a communication link (e.g., the second link 210) between the second external electronic device 202-2 and the first external electronic device 201. For example, the specified time may include the time from a specified first point in time to a specified second point in time based on the clock of the first external electronic device 201. The second point in time may be later than the first point in time. For example, the second external electronic device 202-2 may generate a second audio packet using audio data acquired through the microphone 362 from the specified first point in time to the specified second point in time based on the clock of the first external electronic device 201.

According to other embodiments, the specified condition may include a specified time according to an event count or reference clock of a communication link (e.g., the third link 215) between the electronic device 202-1 and the second external electronic device 202-2. The contents described above may be applied to the event count or reference clock of the third link 215 in the same or similar manner. The second external electronic device 202-2 may generate the second audio packet using audio data acquired through the microphone 362 from the specified first point in time to the specified second point in time based on the event count of the third link 215. For example, the second external electronic device 202-2 may generate the second audio packet using audio data acquired through the microphone 362 from the specified first point in time to the specified second point in time based on the reference clock of the third link 215.

According to various embodiments, the specified condition may include a specified time according to an event count or timing parameter associated with isochronous data transmission between the second external electronic device 202-2 and the first external electronic device 201. The electronic device 202-1 and the second external electronic device 202-2 may perform isochronous data transmission with the first external electronic device 201. For example, the electronic device 202-1 and the second external electronic device 202-2 may perform isochronous data transmission based on a connected isochronous stream (CIS). For another example, the first external electronic device 201 may generate a connected isochronous group (CIG). For example, the CIG generated by the first external electronic device 201 may include a CIS (CIS1) between the electronic device 202-1 and the first external electronic device 201 and a CIS (CIS2) between the second external electronic device 202-2 and the first external electronic device 201.

The specified time according to the event count related to isochronous data transmission between the second external electronic device 202-2 and the first external electronic device 201 may include a time from a specified first point in time to a specified second point in time based on the event count of CIS2. For example, the point in time specified based on the event count of CIS2 may include a point in time when the event count is a specified value or a point in time when the event count is changed (e.g., increased). The second external electronic device 202-2 may generate the second audio packet using audio data acquired through the microphone 362 from the specified first point in time to the specified second point in time based on the event count of CIS2. The contents of the event count of CIS1 described above may be applied to the event count of CIS2 in the same or similar manner.

For example, a timing parameter related to isochronous data transmission between the second external electronic device 202-2 and the first external electronic device 201 may be a parameter (e.g., CIS_Sync_Delay and/or CIG_Sync_Delay) related to a synchronization time point of the CIG including CIS (CIS1) between the second external electronic device 202-2 and the first external electronic device 201. The specified time according to the timing parameter related to isochronous data transmission between the electronic device 202-1 and the first external electronic device 201 may include a time from a specified first point in time to a specified second point in time based on the timing parameter of the CIG including CIS1 and CIS2. For example, the second external electronic device 202-2 may generate the second audio packet using audio data acquired through the microphone 362 from the specified first point in time to the specified second point in time based on the timing parameter of the CIG including CIS1 and CIS2. The contents described above may be equally applied to the timing parameter of the CIG.

According to an embodiment, the second external electronic device 202-2 may insert, into the second audio packet, information for comparing the second audio packet with the first audio packet generated by the electronic device 202-1 in terms of generation order. For example, the information for comparing the second audio packet with the first audio packet generated by the electronic device 202-1 in terms of generation order may include information about the time and order in which the second external electronic device 202-2 generates the second audio packet, or the time and order in which the second external electronic device 202-2 acquires audio data corresponding to the second audio packet. The second external electronic device 202-2 may insert time information including at least one of the specified first point in time or the specified second point in time and order information corresponding to the time information into the second audio packet.

According to one embodiment, the second external electronic device 202-2 may acquire a plurality of second audio packets by generating the second audio packet at a period specified according to a specified condition. The second external electronic device 202-2 may generate the second audio packet according to a specified period based on the clock of the first external electronic device 201. For another example, the second external electronic device 202-2 may generate the second audio packet whenever the event count of the third link 215 increases, or according to a specified period based on the reference clock of the third link 215. For another example, the second external electronic device 202-2 may generate the second audio packet whenever the event count of CIS2 (e.g., cisEventCounter_2) increases, or according to a synchronization period according to the timing parameter of the CIG including CIS1 and CIS2.

The second external electronic device 202-2 may insert time information and order information into each of a plurality of second audio packets. For example, the second external electronic device 202-2 may insert, into each of the plurality of second audio packets, time information including at least one of the specified first point in time or the specified second point in time, which are related to acquisition of audio data corresponding to each of the plurality of second audio packets. The second external electronic device 202-2 may insert, into the plurality of second audio packets, order information including a larger number as the point in time (e.g., the specified first point in time or the specified second point in time) included in the time information of each of the plurality of second audio packets becomes later.

According to an embodiment, the second external electronic device 202-2 may insert order information into each of the plurality of second audio packets. According to various embodiments, the second external electronic device 202-2 may insert the order information into only one of one or more second audio packets having time information with the same specified time unit (e.g., seconds (sec)) among the plurality of second audio packets. According to other embodiments, the second external electronic device 202-2 may insert the order information into only one of a specified number (e.g., two) of consecutive audio packets among the plurality of second audio packets.

According to yet other embodiments, the second external electronic device 202-2 may further include other components not illustrated in FIG. 3. For example, the second external electronic device 202-2 may further include a speaker (e.g., the sound output module 155 in FIG. 1) and/or a sensor (e.g., the sensor module 176 in FIG. 1).

The electronic device 202-1 and the second external electronic device 202-2 may generate the first audio packet and the second audio packet, respectively, using the audio data acquired through the microphones (e.g., the microphone 361 and the microphone 362) of the respective electronic devices in the same time period based on a specified condition. The electronic device 202-1 and the second external electronic device 202-2 may insert the same time information and the same order information into the first audio packet and the second audio packet generated using the audio data acquired in the same time period. For example, the electronic device 202-1 may transmit the plurality of first audio packets to the first external electronic device 201, and the second external electronic device 202-2 may transmit the plurality of second audio packets to the first external electronic device 201. The first external electronic device 201 may not receive the first audio packets and the second audio packets generated using the audio data acquired in the same time period at the same receive (Rx) timing (or one ISO Interval). For example, the first external electronic device 201 may identify a generation time or generation order of the audio packets received from the electronic device 202-1 and the second external electronic device 202-2 regardless of the Rx timing of the audio packets. For example, the first external electronic device 201 may determine an insertion period of information for identifying the generation order of the audio packets in negotiation with the electronic device 202-1 and the second external electronic device 202-2. The insertion period of information for identifying the generation order of the audio packets may be determined by a specified number of consecutive packets. The first external electronic device 201 may confirm the generation order of the audio packets according to the determined insertion period of information for identifying the generation order of the audio packets and identify the generation order of the audio packets received from the electronic device 202-1 and the second external electronic device 202-2. The first external electronic device 201 may synchronize the audio data received from both the electronic device 202-1 and the second external electronic device 202-2 based on the generation time or generation order identified for each audio packet for the plurality of first audio packets received from the electronic device 202-1 and the plurality of second audio packets received from the second external electronic device 202-2.

A structure of the electronic device 202-1 according to one embodiment will be described with reference to FIG. 4. The second external electronic device 202-2 according to one embodiment may have the same or similar structure to the electronic device 202-1 described below, and thus redundant description thereof will be omitted.

Figure 4:
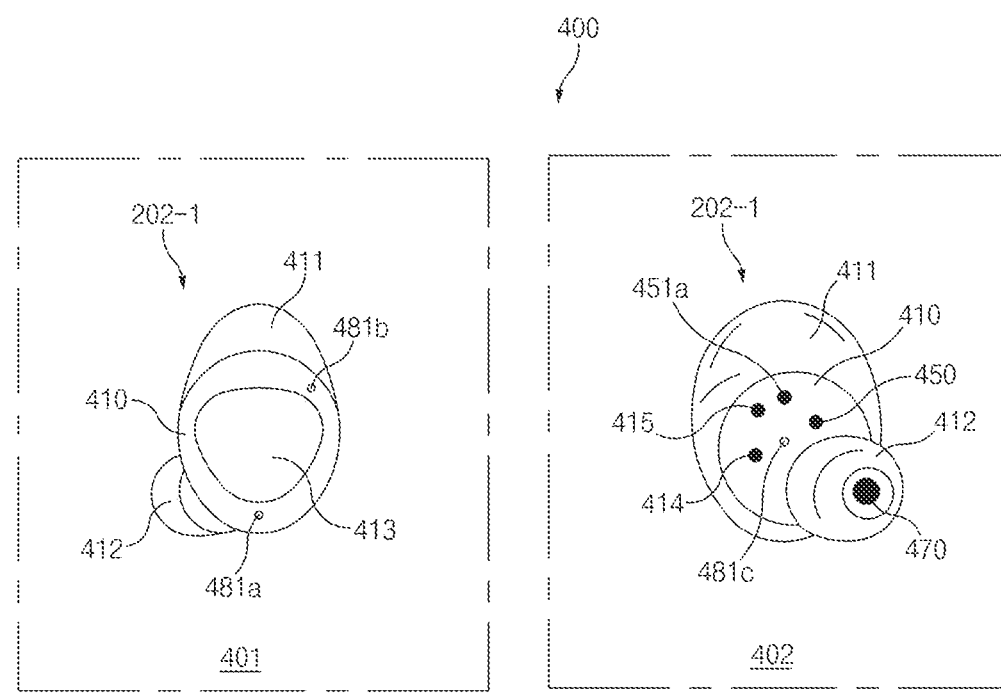
FIG. 4 is a diagram illustrating a front view and a rear view of an electronic device according to an embodiment of the disclosure.

FIG. 4 is a diagram 400 illustrating a front view and a rear view of the electronic device according to an embodiment of the disclosure.

In reference number 401, a front view of an electronic device 202-1 is illustrated. The electronic device 202-1 may include a housing 410. The housing 410 may form at least a portion of the exterior of the electronic device 202-1. The housing 410 may include a button 413 and a plurality of microphones 481*a* and 481*b*, which are disposed on a first surface (e.g., the surface facing the outside when worn) thereof. In FIG. 4, a case including two microphones is given as an example, but the number of the microphones is not limited thereto. In an example, the plurality of microphones may further include other microphones in addition to the first microphone 481*a* and the second microphone 481*b*. The button 413 may be configured to receive a user input (e.g., a touch input or a push input). A first microphone 481*a* and a second microphone 481*b* may be included in the microphone 361 of FIG. 3. The first microphone 481*a* and the second microphone 481*b* may be disposed to detect sound in a direction facing the outside of the user when the electronic device 202-1 is worn. The first microphone 481*a* and the second microphone 481*b* may detect sound outside the housing 410. The first microphone 481*a* and the second microphone 481*b* may be referred to as external microphones. For example, the first microphone 481*a* and the second microphone 481*b* may detect sound generated in the vicinity of the electronic device 202-1. The sound of the surrounding environment that is detected by the electronic device 202-1 may be output by the speaker 470. In an embodiment, the first microphone 481*a* and the second microphone 481*b* may be sound pickup microphones for a noise canceling function (e.g., active noise cancellation (ANC)) of the electronic device 202-1. In addition, the first microphone 481*a* and the second microphone 481*b* may be sound pickup microphones for an ambient sound listening function (e.g., a transparency function or an ambient aware function) of the electronic device 202-1. For example, the first microphone 481*a* and the second microphone 481*b* may include various types of microphones including an electronic condenser microphone (ECM) and a micro electro mechanical system (MEMS) microphone. A wing tip 411 may be coupled to the periphery of the housing 410. The wing tip 411 may be formed of an elastic material. The wing tip 411 may be detached from the housing 410 or attached to the housing 410. The wing tip 411 may improve the wearability of a first wireless audio device 202-1.

In reference number 402, a rear view of the electronic device 202-1 is illustrated. The housing 410 may include a first electrode 414, a second electrode 415, a proximity sensor 450, a third microphone 481*c*, and a speaker 470, which are disposed on a second surface (e.g., the surface facing the user when worn) of thereof. The speaker 470 may convert an electrical signal into a sound signal. The speaker 470 may output a sound to the outside of the electronic device 202-1. In an example, the speaker 470 may convert an electrical signal into a sound that the user may audibly recognize and output the sound. At least a portion of the speaker 470 may be disposed inside the housing 410. The speaker 470 may be coupled to an ear tip 412 through one end of the housing 410. The ear tip 412 may be formed in a cylindrical shape with a hollow formed therein. For example, when the ear tip 412 is coupled to the housing 410, the sound (audio) output from the speaker 470 may be transmitted to an external object (e.g., a user) through the hollow of the ear tip 412.

In an embodiment, the electronic device 202-1 may include a sensor 451*a* (e.g., an acceleration sensor, a bone conduction sensor, and/or a gyro sensor) disposed on the second surface of the housing 410. The position and shape of the sensor 451*a* illustrated in FIG. 4 are exemplary, and embodiments of the disclosure are not limited thereto. For example, the sensor 451*a* may be disposed inside the housing 410 so as not to be exposed to the outside. The sensor 451*a* may be located at a position that may contact with the ear of the wearer or at a portion of the housing 410 that contacts the ear of the wearer, when worn.

The ear tip 412 may be formed of an elastic material (or a flexible material). The ear tip 412 may assist the electronic device 202-1 to be inserted in close contact with the ear of the user. In an example, the ear tip 412 may be formed of a silicone material. At least one region of the ear tip 412 may be deformed conforming to the shape of the external object (e.g., the shape of the ear kernel). According to various embodiments disclosed herein, the ear tip 412 may be formed of a combination of at least two of silicone, foam, and plastic material. For example, a region of the ear tip 412 which is inserted into the ear of the user and abuts against it may be formed of a silicone material, and a region into which the housing 410 is inserted may be formed of a plastic material. The ear tip 412 may be detached from the housing 410 or attached to the housing 410. The first electrode 414 and the second electrode 415 may be connected to an external power source (e.g., a case) and receive an electrical signal from the external power source. The proximity sensor 450 may be used to detect a wear state of the user. The proximity sensor 450 may be disposed inside the housing 410. The proximity sensor 450 may be disposed such that at least a portion thereof is exposed as the exterior of the electronic device 202-1. The electronic device 202-1 may determine whether or not the electronic device 202-1 is worn by the user based on data measured by the proximity sensor 450. The proximity sensor 450 may include an IR sensor. The IR sensor may detect whether or not the housing 410 is in contact with the body of the user, and the electronic device 202-1 may determine whether or not the electronic device 202-1 is worn based on the detection of the IR sensor. The proximity sensor 450 is not limited to the IR sensor, and may be implemented by using various types of sensors (e.g., an acceleration sensor or a gyro sensor). The third microphone 481*c* may be included in the microphone 361 in FIG. 3. The third microphone 481*c* may be disposed to detect a sound in a direction toward the user when the electronic device 202-1 is worn. The third microphone 481*c* may be referred to as an internal microphone.

With reference to FIGS. 5 to 8, a connected isochronous stream (CIS) between an electronic device 202-1 and a first external electronic device 201 and a CIS between a second external electronic device 202-1 and the first external electronic device 201, according to one embodiment, will be described.

FIG. 5 is a diagram 500 illustrating one example of parameters of a connected isochronous stream (CIS) according to an embodiment of the disclosure.

Figure 6:
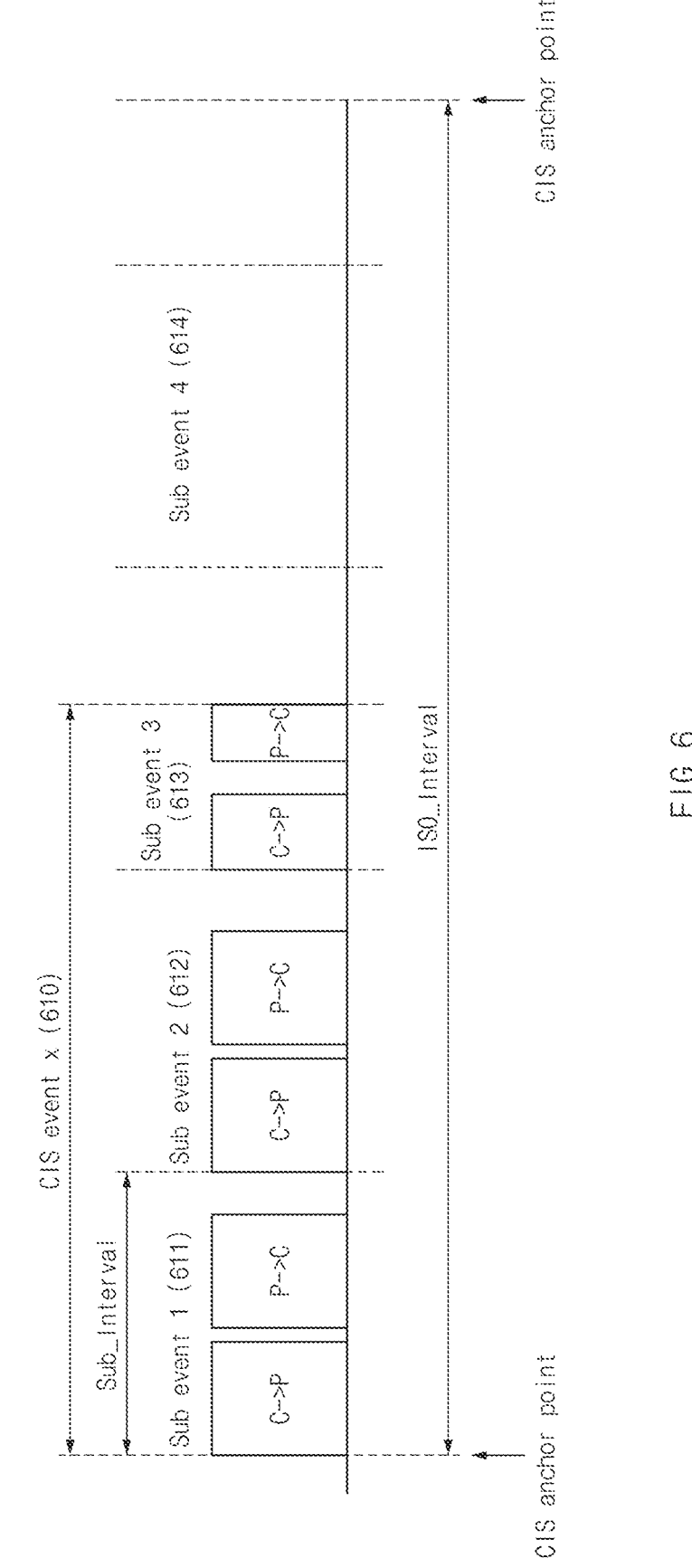
FIG. 6 is a diagram illustrating one example of a CIS event according to an embodiment of the disclosure.

FIG. 6 is a diagram 600 illustrating one example of a CIS event according to an embodiment of the disclosure.

Figure 7:
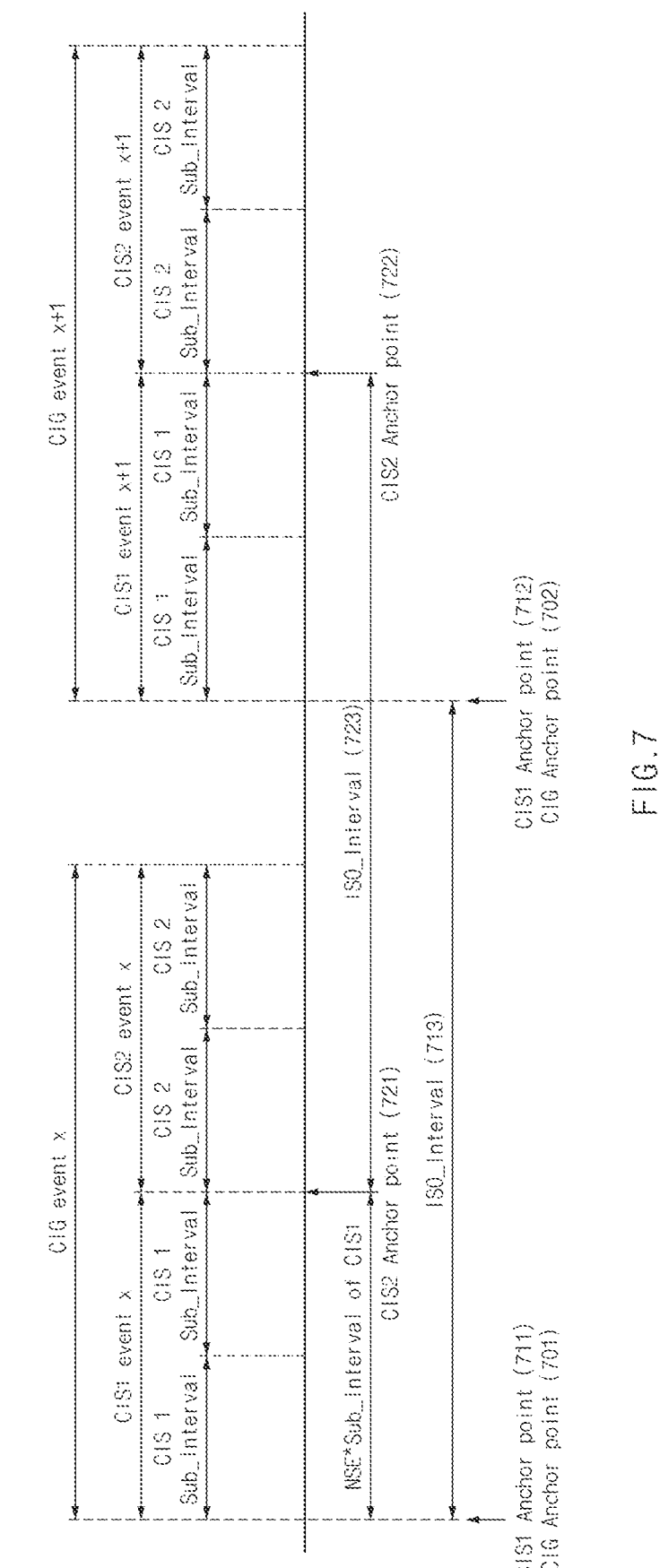
FIG. 7 is a diagram illustrating one example of consecutive CIS events according to an embodiment of the disclosure.

FIG. 7 is a diagram 700 illustrating one example of consecutive CIS events according to an embodiment of the disclosure.

Figure 8:
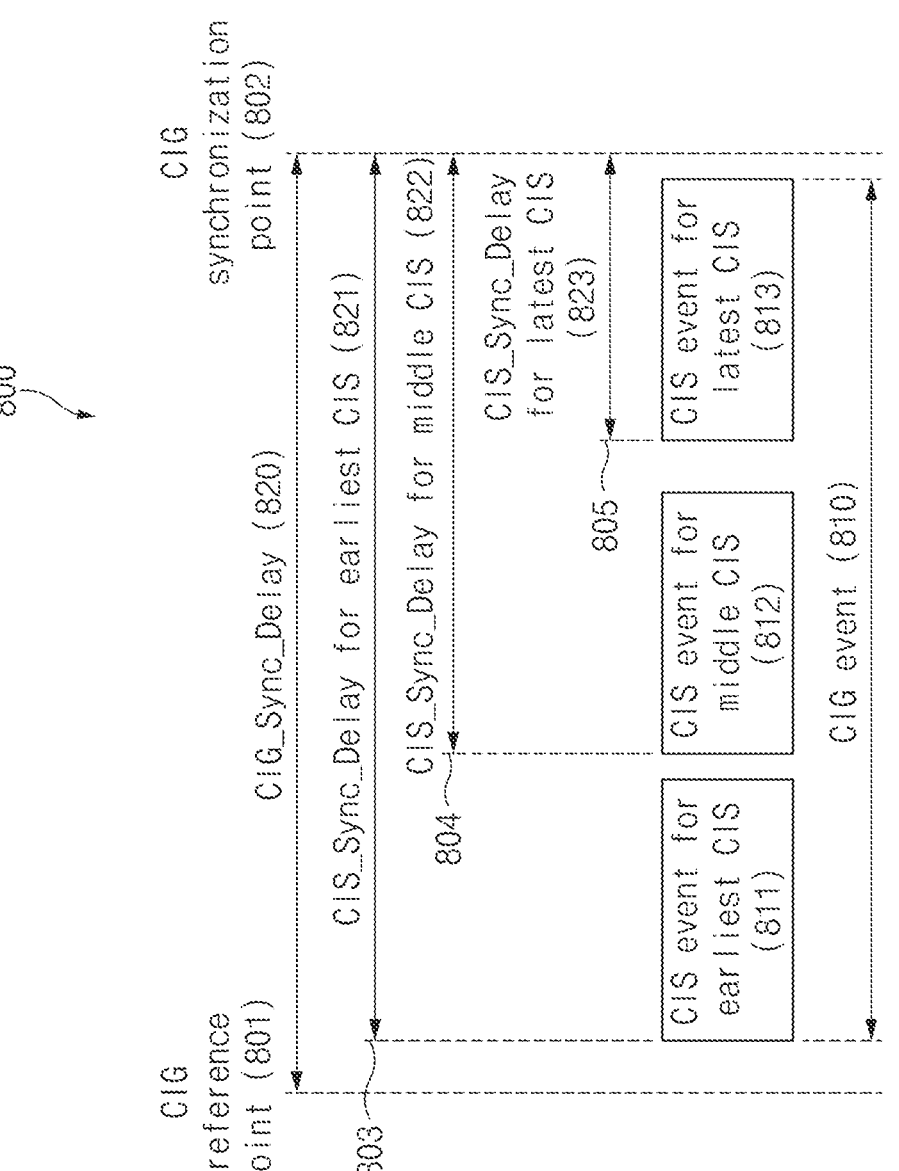
FIG. 8 is a diagram illustrating one example of a layout of a connected isochronous group (CIG) event according to an embodiment of the disclosure.

FIG. 8 is a diagram 800 illustrating one example of a layout of a CIG (connected isochronous group) event according to an embodiment of the disclosure.

According to an embodiment, a CIS may be generated between the electronic device 202-1 and the first external electronic device 201. According to another embodiment, a CIS may be generated between the second external electronic device 202-2 and the first external electronic device 201. The connected isochronous stream (CIS) means logical transmission for transmitting isochronous data in any direction between electronic devices with an established communication link (e.g., the first link 205 or the second link 210 in FIG. 2) based on the Bluetooth protocol. Data may be of fixed or variable size, and may be framed or unframed. Since the CIS allows variable-sized packets and the transmission of one or more packets in each isochronous event, a data rate may be adjusted. Data transmission direction may be either unidirectional or bidirectional. The CIS may include an acknowledgment protocol for improving the reliability of packet transmission.

For example, each CIS may have an identifier defined as CIS_ID. According to an embodiment, a host (e.g., processor 340) of the first external electronic device 201, which is a central device, may assign a CIS_ID to each of a CIS (CIS1) with the electronic device 202-1 and a CIS (CIS2) with the second external electronic device 202-2. For example, the CIS_ID may be shared with a host of a peripheral device via a link layer (LL), but is not used in the LL. According to another embodiment, the CIS_ID assigned to the electronic device 202-1 maybe shared with a host (e.g., processor 381) of the electronic device 202-1, which is a peripheral device, via the link layer (LL). The CIS_ID assigned to the second external electronic device 202-2 may be shared with a host (e.g., the processor 382) of the second external electronic device 202-2, which is a peripheral device, via a link layer (LL).

For example, each CIS may be defined by various parameters. Parameters of the CIS may include, for example, at least one of ISO_Interval, Sub_Interval, SE_Length, Max_PDU, Max_SDU, MPT_C/MPT_P, NSE, BN/FT, or Framed. ISO_Interval means a time between CIS anchor points of adjacent CIS events. Sub_Interval means a time between starts of two consecutive sub events of the CIS. SE_Length means the maximum length of a sub event. Max_PDU means the maximum number of data octets capable of being transmitted to each CIS data PDU (protocol data unit), and its value may be different in each direction. Max_SDU means the maximum size of an SDU (service data unit) on the CIS, and its value may be different in each direction. MPT_C and MPT_P mean times it takes for the central device and the peripheral device to transmit a packet containing a CIS PDU with a payload of Max_PDU octets in a corresponding direction through a physical layer (PHY) used for the CIS, respectively. For LE Coded PHY, S=8 coding is assumed. NSE means the maximum number of sub events of each CIS event. BN (burst number) and FT (flush point) control data transmitted in each CIS event, and their values may be different in each direction. "Framed" indicates whether or not the CIS transmits framed data or unframed data, and its value is the same in both directions. These parameters do not change during the lifetime of the CIS.

For example, both the central device and the peripheral device have a 39-bit counter, cisEventCounter. The counter is set to 0 for the first CIS, and is incremented by one for each CIS event, regardless of whether or not the central device transmits isochronous PDUs (e.g., connected isochronous PDUs) during the event. In an embodiment, as a CIS event occurs in the CIS (CIS1) between the first external electronic device 201 and the electronic device 202-1, cisEventCounter(cisEventCounter_1) between the first external electronic device 201 and the electronic device 202-1 may increase by one, starting from 0. In another embodiment, as a CIS event occurs in the CIS (CIS2) between the first external electronic device 201 and the second external electronic device 202-2, cisEventCounter (cisEventCounter_2) between the first external electronic device 201 and the second external electronic device 202-2 may increase by one, starting from 0.

For example, each CIS has a cisPayloadNumber of 39 bits (however, CIS Null PDU does not have cisPayloadNumber), and each CIS is terminated when its value becomes at least $2^{39}-1$.

For example, a link layer (LL) of the central device may generate a CIS between the central device and the peripheral device by transmitting LL_CIS_REQ PDU to the link layer of the peripheral device. For example, the link layer of the central device may set the parameters illustrated in FIG. 5 through the LL_CIS_REQ PDU. According to an embodiment, when the first external electronic device 201 generates a CIS between the electronic device 202-1 and/or the second external electronic device 202-2, the first external electronic device 201 may set the parameters illustrated in FIG. 5.

For example, with reference to FIG. 5, the parameters set by the first external electronic device 201 when the CIS is generated may include CIG_ID, CIS_ID, PHY_C_To_P, PHY_P_To_C, Max_SDU_C_To_P, RFU, Framed, Max_SDU_P_To_C, RFU, SDU_Interval_C_To_P, RFU, SDU_Interval_P_To_C, RFU, Max_PDU_C_To_P, Max_PDU_P_To_C, NSE, Sub_Interval, BN_C_To_P, BN_P_To_C, FC_C_To_P, FC_P_TO_C, ISO_Interval, CIS_Offset_Min, CIS_Offset_Max, or connEventCount. CIG_ID means a CIG identifier. CIS_ID means a CIS identifier. PHY_C_To_P means a PHY used to transmit packets from the central device to the peripheral device. PHY_P_To_C means a PHY used to transmit packets from the peripheral device to the central device. Max_SDU_C_To_P means the maximum size of octet units of the SDU transmitted from the central device to the peripheral device. Framed is set to 0 for unframed data PDU and is set to 1 for framed data PDU. Max_SDU_P_To_C means the maximum size of octet units of the SDU transmitted from the peripheral device to the central device. SDU_Interval_C_To_P is set in microseconds and means the time between two consecutive SDUs transmitted from the central device to the peripheral device. SDU_Interval_P_To_C is set in microseconds and means the time between two consecutive SDUs transmitted from the peripheral device to the central device. Max_PDU_C_To_P means the maximum size of the octet units of the payload transmitted from the central device to the peripheral device. Max_PDU_P_To_C means the maximum size of octet units of the payload transmitted from the peripheral device to the central device. NSE means the maximum number of sub events of each CIS event. Sub_Interval is set in microseconds and means the time between the start of a sub event and the start of the next sub event for the same CIS event. BN_C_To_P means a BN parameter used for data transmission from the central device to the peripheral device. BN_P_To_C means a BN parameter used for data transmission from the peripheral device to the central device. FT_C_To_P means an FC parameter used for data transmission from the central device to the peripheral device. FC_P_To_C means an FC parameter used for data transmission from the peripheral device to the central device. CIS_Offset_Min is set in microseconds and means a suggested minimum time between an ACL anchor point of a connection event with connEventCount and a first CIS anchor point. CIS_Offset_Max is set in microseconds and means a suggested maximum time between the ACL anchor point of the connection event with connEventCount and the first CIS anchor point. connEventCount means a connection event counter value. The connection event means a synchronization time point between the central device and the peripheral device.

The event count associated with the isochronous data transmission disclosed herein may include, for example, at least one of cisEventCounter, cisPayloadnumber, or connEventCount.

Referring to FIG. 6, one CIS event may include one or more sub events (e.g., a first sub event (Sub event 1) 611, a second sub event (Sub event 2) 612, a third sub event (Sub event 3) 613, and a fourth sub event (Sub event 4) 614, and a central device C may transmit a packet at the start of each sub event until the CIS event ends. When a peripheral device P receives the packet from the central device C, the peripheral device P may transmit a response packet after finishing receiving the packet, regardless of whether or not there is an error in the packet. When the peripheral device P does not receive the packet from the central device C in the same sub event, the peripheral device P does not transmit the packet.

Referring to FIG. 6, for example, in the first sub event 611, the second sub event 612, and the third sub event 613, the central device C may transmit a packet to the peripheral device P, and the peripheral device P may transmit the packet to the central device C after receiving the packet from the central device C. In the fourth sub event 614, as the central device C does not transmit a packet to the peripheral device P, and the peripheral device P does not receive a packet from the central device C, the peripheral device P does not transmit a packet to the central device C. For example, referring to an x-th CIS event (CIS event x) 610, the electronic device (the central device C or peripheral device P) may use some (the first sub event 611, the second sub event 612, and the third sub event 613) among sub events (the first sub event 611, the second sub event 612, the third sub event 613, and the fourth sub event 614) included in the CIS event. The total number (e.g., four) of sub events included in one CIS event and the number (e.g., three) of sub events actually used are not limited to the example illustrated in FIG. 6.

The central device C may be referred to as the first external electronic device 201, and the peripheral device P may be referred to as the electronic device 202-1 or the second external electronic device 202-2.

Referring to FIG. 7, the first external electronic device 201 may generate a connected isochronous group (CIG). The CIG may include, for example, CIS1 generated between the first external electronic device 201 and the electronic device 202-1, and CIS2 generated between the first external electronic device 201 and the second external electronic device 202-2. FIG. 7 illustrates an example in which one CIG includes two CISs (CIS1 and CIS2), but the number of CISs constituting the CIG is not limited to the example illustrated in FIG. 7. ISO_Interval 713 of CIS1 and ISO_Interval 723 of CIS2 are the same. ISO_Interval 713 of CIS1 is the time between anchor points of adjacent CIS1 (e.g., 711 and 712), and ISO_Interval 723 of CIS2 is the time between anchor points of adjacent CIS2 (e.g., 721 and 722).

The CIG event (CIG event x or CIG event x+1) may include one CIS1 event and one CIS2 event. For example, the CIS1 event (CIS1 event x or CIS1 event x+1) or the CIS2 event (CIS2 event x or CIS2 event x+1) may include one or more sub events. The number of sub events in CIS1 and CIS2 are not limited to the example illustrated in FIG. 7. For example, a starting point in time of the CIG event (e.g., the CIG anchor point 701 or 702) and a starting point in time of the CIS1 event (e.g., the CIS1 anchor point 711 or 712) may be the same. In an example, in the same CIG event, the CIS2 event may be started as all sub events included in the CIS1 event start and end. For example, the starting point in time of the CIS2 event (e.g., the CIS2 anchor point 721 or 722) may be a point in time when time obtained by multiplying NSE (the number of sub events included in CIS1) of the CIS1 by Sub_Interval (time between starts of adjacent sub events) of the CIS1 has elapsed from the CIG anchor point 701 or 702 or the CIS1 anchor point 711 or 712.

Referring to FIG. 8, a CIG event 810 may be composed of CIS events 811, 812, and 813 of CISs constituting the CIG. Each CIG event (e.g., 810) may start at an anchor point (e.g., 803) of the CIS event (e.g., 811) with the earliest transmission order (CIS event for the earliest CIS) and end at an anchor point (e.g., 805) of the CIS event (e.g., 813) with the latest transmission order (CIS event for the latest CIS) in the same CIG event (e.g., 810). Two CIG events may not overlap, for example, the last CIS event of a given CIG event may have to end before an anchor point of the first CIS event of the next CIG event.

For example, the link layer of the central device may provide timing parameters (e.g., CIS_Sync_Delay and CIG_Sync_Delay) to the link layer of the peripheral device to allow synchronization of isochronous data in the application layer. Each CIG event (e.g., 810) may have a CIG reference point (e.g., 801) and a CIG synchronization point (e.g., 802). The CIG synchronization point (e.g., 802) may be as far away as CIG_Sync_Delay (e.g., 820) from the CIG reference point (e.g., 801). Each CIG event (e.g., 810) may start no earlier than the CIG reference point (e.g., 801) and may end no later than the CIG synchronization point (e.g., 802). For CIS events (e.g., 811, 812, and 813) constituting the CIG event (e.g., 810), each CIS anchor point (e.g., 803, 804, or 805) may be a fixed offset after the CIG reference point (e.g., 801). For each CIS, CIS_Sync_Delay (e.g., 821, 822, or 823) may be equal to the time from the CIS anchor point (e.g., 803, 804, or 805) to the CIG synchronization point (e.g., 802). The CIG reference point (e.g., 801) and the CIG synchronization point (e.g., 802) may be separated by an ISO_Interval.

For example, CIG_Sync_Delay (e.g., 820) may have the same value for all CIS events (e.g., 811, 812, and 813) of the same CIG event (e.g., 810). The CIS_Sync_Delay (e.g., 821, 822, or 823) for each CIS event may be equal to a value obtained by subtracting, from the CIG_Sync_Delay (e.g., 820), the offset from the CIG reference point (e.g., 801) to each CIS anchor point (e.g., 803, 804, or 805).

For example, all CIS events (e.g., 811, 812, and 813) constituting the CIG event (e.g., 810) may not have the same cisEventCounter value, but over the lifetime of the CIG, the difference between the counters may be the same.

FIG. 8 illustrates an example in which there are three CIS events constituting one CIG event, but the number of CIS events constituting the CIG event is not limited to the example illustrated in FIG. 8.

Timing parameters associated with isochronous data transmission disclosed herein may include, for example, at least one of CIS_Sync_Delay (e.g., 821, 822, or 823) or CIG_Sync_Delay (e.g., 820).

Figure 9:
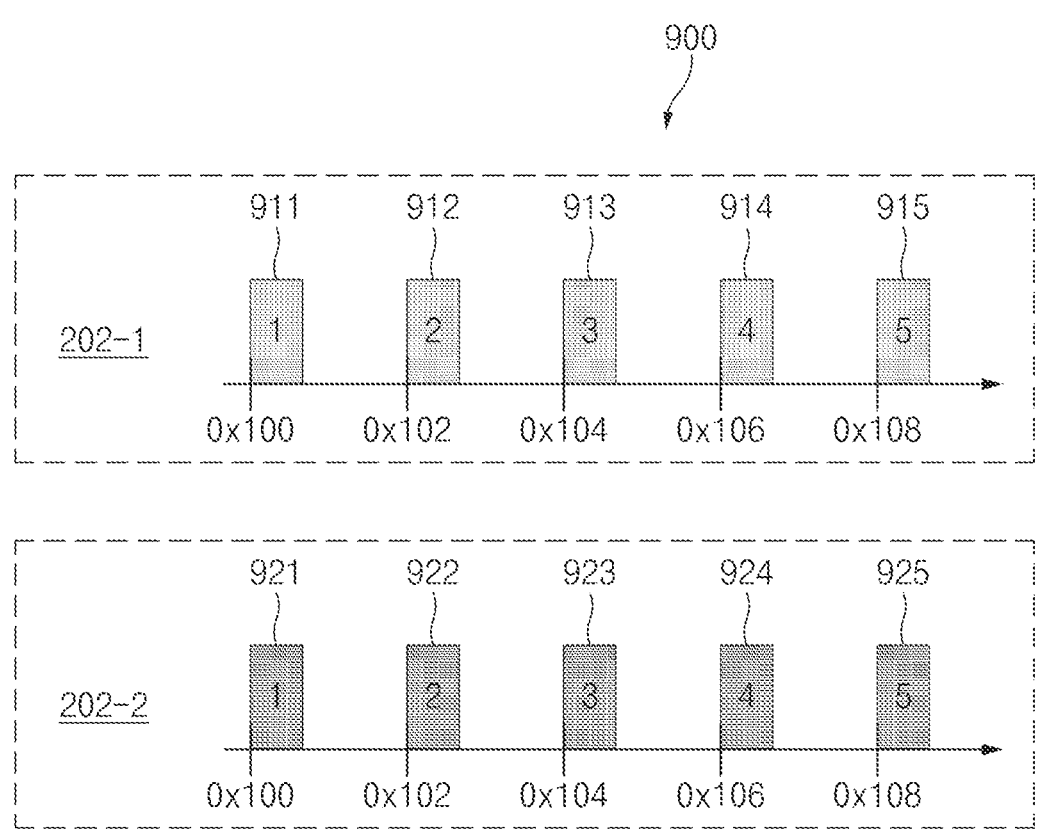
FIG. 9 is a diagram for describing an operation of an electronic device according to an embodiment of the disclosure.

With reference to FIG. 9, an operation of an electronic device 202-1 according to one embodiment for generating an audio packet in the same period as a second external electronic device 202-2 and inserting, into the audio packet, information for comparing the audio packet with an audio packet generated by the second external electronic device 202-2 in terms of generation order will be described.

FIG. 9 is a diagram 900 for describing an operation of an electronic device according to an embodiment of the disclosure.

Although not illustrated in the drawing, but as illustrated in FIG. 3, an electronic device 202-1 and a second external electronic device 202-2, which will be described below, may be in a state of being connected to a first external electronic device 201 through a first link 205 and a second link 210, respectively, and the electronic device 202-1 and the second external electronic device 202-2 may be connected through a third link 215. The contents described above with reference to FIG. 3 maybe equally applied to the first link 205, the second link 210, and the third link 215. For example, the electronic device 202-1 and the second external electronic device 202-2 may receive a request for audio data generated in the same time period from the first external electronic device 201 through the first link 205 and the second link 210, respectively.

Referring to FIG. 9, as the electronic device 202-1 and the second external electronic device 202-2 receive a request for audio data generated in the same time period from the first external electronic device 201, the electronic device 202-1 and the second external electronic device 202-2 may generate audio packets using the audio data acquired in the same time period through each of the microphones (e.g., the microphone 361 or the microphone 362 in FIG. 3). Horizontal axes of the electronic device 202-1 and the second external electronic device 202-2 illustrated in FIG. 9 may represent the same time axis. In an example, 0x100, 0x102, 0x104, 0x106, and 0x108 may represent points in time that are same for the electronic device 202-1 and the second external electronic device 202-2. The same point in time for the electronic device 202-1 and the second external electronic device 202-2 may include, for example, a point in time according to a clock at which the electronic device 202-1 and the second external electronic device 202-2 communicate. 0x100, 0x102, 0x104, 0x106, and 0x108 are examples of points of time according to clocks that are equally applied to the electronic device 202-1 and the second external electronic device 202-2, and the points of time are not limited to the expression of the example.

According to an embodiment, the electronic device 202-1 may generate an audio packet using audio data acquired through the microphone 361 in the same time period as the second external electronic device 202-2 based on a specified condition. According to another embodiment, the same time period for the electronic device 202-1 as that for the second external electronic device 202-2 maybe determined based on the specified condition. According to yet another embodiment, the specified condition may include a specified time based on the clock of the first external electronic device 201, a specified time based on the event count or reference clock of the third link 215 between the electronic device 202-1 and the second external electronic device 202-2, or a specified time based on the event count or timing parameter associated with isochronous data transmission between the electronic device 202-1 and the first external electronic device 201. The specified time may be, for example, a time between the first point in time and the second point in time.

The electronic device 202-1 may an audio packet 911, 912, 913, 914, or 915 using the audio data acquired through the microphone 361 during the time between the first point in time and the second point in time based on the clock of the first external electronic device 201 transmitting the audio data request. For example, the first point in time, which is a starting point in time of the audio packet 911, 912, 913, 914, or 915, may correspond to 0x100, 0x102, 0x104, 0x106, or 0x108.

For another example, the electronic device 202-1 may generate the audio packet 911, 912, 913, 914, or 915 using the audio data acquired during the time between the first point in time and the second point in time based on the event count or reference clock of the third link 215 between the electronic device 202-1 and the second external electronic device 202-2. For example, the first point in time, which is a starting point in time of the audio packet 911, 912, 913, 914, or 915, may correspond to 0x100, 0x102, 0x104, 0x106, or 0x108. When the electronic device 202-1 generates the audio packet 911, 912, 913, 914, or 915 based on the reference clock of the third link 215, the first point in time, which is the starting point in time of the audio packet 911, 912, 913, 914, or 915, may correspond to a point in time according to a clock at which the electronic device 202-1 and the second external electronic device 202-2 communicate after the electronic device 202-1 and the second external electronic device 202-2 have received a request (e.g., request for binaural recording) for audio data generated in the same time period from the first external electronic device 201. For example, when the electronic device 202-1 generates the audio packet 911, 912, 913, 914, or 915 based on the event count of the third link 215, the first point in time, which is the starting point in time of the audio packet 911, 912, 913, 914, or 915, may be a point in time when the event count increases, and the second point in time, which is the ending point in time of the audio packet 911, 912, 913, 914, or 915, may be a point in time when a specified time has elapsed from the first point in time.

For still another example, the electronic device 202-1 may generate the audio packet 911, 912, 913, 914, or 915 using the audio data acquired during the time between the first point in time and the second point in time based on the event count or timing parameter associated with isochronous data transmission between the electronic device 202-1 and the first external electronic device 201. The first point in time, which is a starting point in time of the audio packet 911, 912, 913, 914, or 915, may correspond to 0x100, 0x102, 0x104, 0x106, or 0x108. For example, when the electronic device 202-1 generates the audio packet 911, 912, 913, 914, or 915 based on the event count associated with isochronous data transmission, the first point in time, which is the starting point in time of the audio packet 911, 912, 913, 914, or 915, may be a point in time when the event count increases, and the second point in time, which is the ending point in time of the audio packet 911, 912, 913, 914, or 915, may be a point in time when a specified time has elapsed from the first point in time. For example, the event count associated with the isochronous data transmission may include, for example, at least one of cisEventCounter, cisPayloadnumber, or connEventCount described above in the description of FIGS. 3 and 5. For example, when the electronic device 202-1 generates the audio packet 911, 912, 913, 914, or 915 based on the timing parameter associated with isochronous data transmission, the first point in time, which is the starting point in time of the audio packet 911, 912, 913, 914, or 915, may be a point in time capable of being specified by the timing parameter, and the second point in time, which is the ending point in time of the audio packet 911, 912, 913, 914, or 915, may be a point in time when a specified time has elapsed from the first point in time. The timing parameter associated with isochronous data transmission may include at least one of CIS_Sync_Delay or CIG_Sync_Delay described above in the description of FIGS. 3 and 5.

In an embodiment, the second external electronic device 202-2 may generate an audio packet using audio data acquired through the microphone 362 in the same time period as the electronic device 202-1 based on a specified condition. According to another embodiment, the specified condition may be a condition related to audio packet generation which is equally applied to the electronic device 202-1 and the second external electronic device 202-2. The method of generating an audio packet by the electronic device 202-1 described above may be applied to a method of generating audio packets 921, 922, 923, 924, and 925 based on the specified condition by the second external electronic device 202-2 in the same or similar manner. For example, the first audio packet 911 of the electronic device 202-1 and the first audio packet 921 of the second external electronic device 202-2 maybe audio packets generated using audio data acquired through different microphones in the same time period. A relationship between the second audio packet 912 of the electronic device 202-1 and the second audio packet 922 of the second external electronic device 202-2, a relationship between the third audio packet 913 of the electronic device 202-1 and the third audio packet 923 of the second external electronic device 202-2, a relationship between the fourth audio packet 914 of the electronic device 202-1 and the fourth audio packet 924 of the second external electronic device 202-2, and a relationship between the fifth audio packet 915 of the electronic device 202-1 and the fifth audio packet 925 of the second external electronic device 202-2 may be the same as the relationship between the first audio packet 911 of the electronic device 202-1 and the first audio packet 921 of the second external electronic device 202-2, which is described above.

The electronic device 202-1 may insert, into the generated audio packets 911, 912, 913, 914, and 915, information for comparing the audio packets 911, 912, 913, 914, and 915 with the audio packets 921, 922, 923, 924, and 925 generated by the second external electronic device 202-2 in terms of generation order. For example, the electronic device 202-1 may insert, into each of the first audio packet 911, the second audio packet 912, the third audio packet 913, the fourth audio packet 914, and the fifth audio packet 915, time information including at least one of a starting point in time and an ending point in time of the audio packet. For example, the electronic device 202-1 may insert 0x100 into the first audio packet 911, insert 0x102 into the second audio packet 912, insert 0x104 into the third audio packet 913, insert 0x106 into the fourth audio packet 914, and insert 0x108 into the fifth audio packet 915. In an example, the electronic device 202-1 may insert, into the first audio packet 911, the second audio packet 912, the third audio packet 913, the fourth audio packet 914, and the fifth audio packet 915, order information including numbers that increase with a chronological order of time information (e.g., the starting point in time or the ending point in time) about each audio packet. For example, the electronic device 202-1 may insert 1 into the first audio packet 911, insert 2 into the second audio packet 912, insert 3 into the third audio packet 913, insert 4 into the fourth audio packet 914, and insert 5 into the fifth audio packet 915.

According to one embodiment, the second external electronic device 202-2 may insert, into the generated audio packets 921, 922, 923, 924, and 925, information for comparing audio packets 921, 922, 923, 924, and 925 with the audio packets 911, 912, 913, 914, and 915 generated by the electronic device 202-1 in terms of generation order. According to another embodiment, the second external electronic device 202-2 may insert, the audio packets generated by the second external electronic device 202-2, information for comparing the audio packets with the audio packets generated by the electronic device 202-1 in terms of generation order in the same or similar method as the insertion method for the electronic device 202-1 described above. For example, the second external electronic device 202-2 may insert 0x100 into the first audio packet 921, insert 0x102 into the second audio packet 922, insert 0x104 into the third audio packet 923, insert 0x106 into the fourth audio packet 924, and insert 0x108 into the fifth audio packet 925. In an example, the second external electronic device 202-2 may insert 1 into the first audio packet 921, insert 2 into the second audio packet 922, insert 3 into the third audio packet 923, insert 4 into the fourth audio packet 924, and insert 5 into the fifth audio packet 925. The information by the electronic device 202-1 and the information by the second external electronic device 202-2, which are generated in the same time period and inserted into the audio packets, may be the same as described above, and though not the same, may be sufficient if matched with each other.

According to various embodiments, the electronic device 202-1 may insert the order information into only one of one or more audio packets having time information with the same specified time unit among a plurality of audio packets. When a starting point in time of the first audio packet 911 (e.g., 0x100), a starting point in time of the second audio packet 912 (e.g., 0x102), and a starting point in time of the third audio packet 913 (e.g., 0x104) have the same unit of seconds and a starting point in time of the fourth audio packet 914 (e.g., 0x106) and a starting point in time of the fifth audio packet 915 (e.g., 0x108) have the same unit of seconds, the electronic device 202-1 may insert order information (e.g., 1) into only one audio packet (e.g., the first audio packet 911 with the earliest starting point in time) among the first audio packet 911, the second audio packet 912, and the third audio packet 913, and may insert order information (e.g., 2) into only audio packet (the fourth audio packet 914 with the earliest starting point in time) among the fourth audio packet 914 and the fifth audio packet 915. The method of inserting order information by the electronic device 202-1 may be applied to the second external electronic device 202-2 in the same or similar manner.

According to other embodiments, the electronic device 202-1 may insert the order information into only one of a specified number (e.g., two) of consecutive audio packets among a plurality of audio packets. For example, when the time is delayed in the order of a starting point in time of the first audio packet 911 (e.g., 0x100), a starting point in time of the second audio packet 912 (e.g., 0x102), and a starting point in time of the third audio packet 913 (e.g., 0x104), a starting point in time of the fourth audio packet 914 (e.g., 0x106) and a starting point in time of the fifth audio packet 915 (e.g., 0x108) and the cycle for inserting order information is two packets, the electronic device 202-1 may insert order information into the first audio packet 911, the third audio packet 913, and the fifth audio packet 915. The order information inserted into the audio packets by the electronic device 202-1 may include numbers that increase in order of the first audio packet 911, the third audio packet 913, and the fifth audio packet 915. For example, the electronic device 202-1 may insert order information into the second audio packet 912 and the fourth audio packet 914. The order information inserted into the fourth audio packet 914 may include a larger number than the order information inserted into the second audio packet 912. The method of inserting order information by the electronic device 202-1 maybe applied to the second external electronic device 202-2 in the same or similar manner.

According to the above-described embodiments, the first external electronic device 201, which has received the audio packets from the electronic device 202-1 and the second external electronic device 202-2, may identify an audio packet pair generated in the same time period by the electronic device 202-1 and the second external electronic device 202-2 based on the time information and order information inserted to the audio packets.

Figure 10:
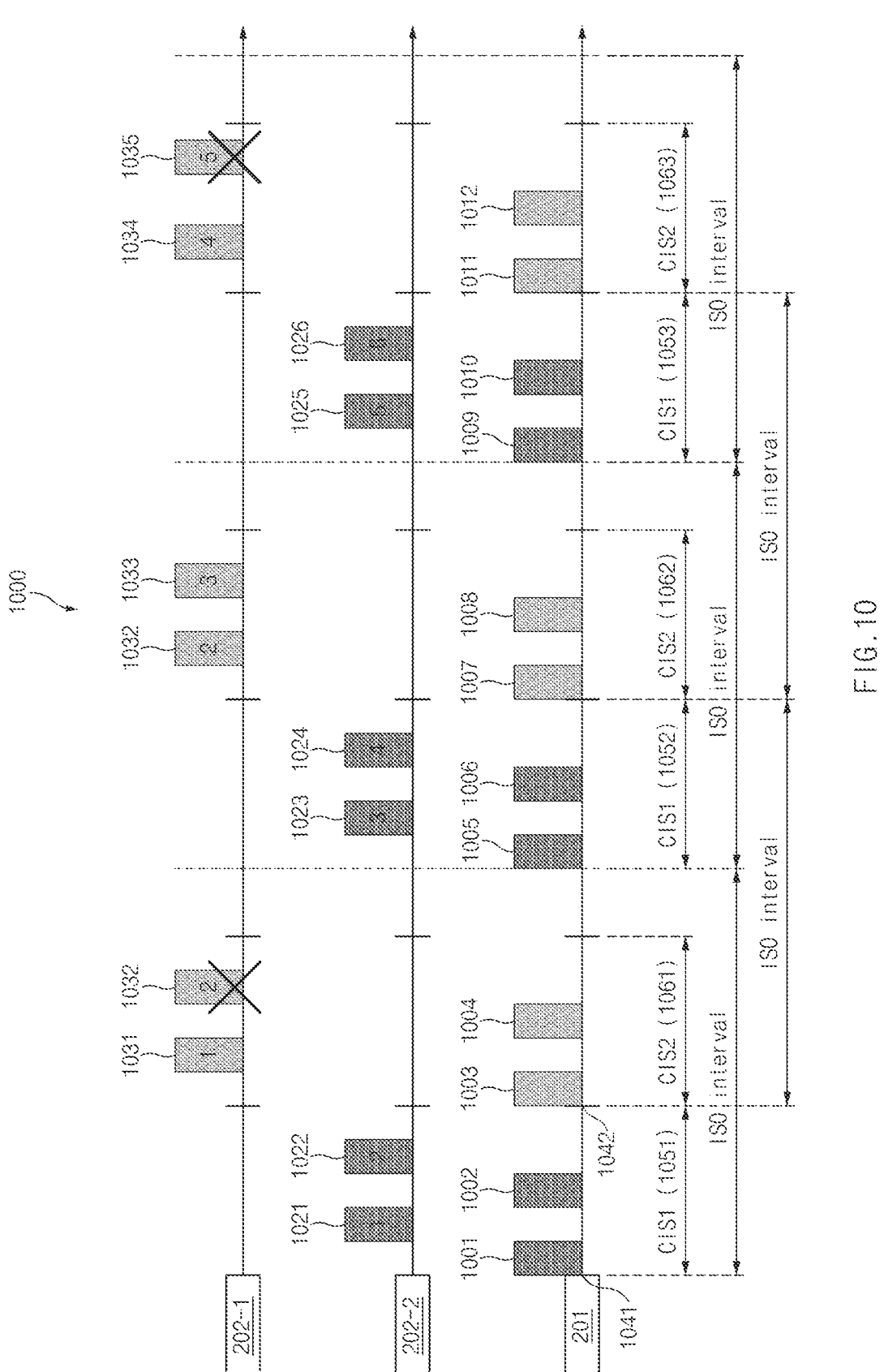
FIG. 10 is a diagram for describing operations of electronic devices according to an embodiment of the disclosure.

With reference to FIG. 10, an operation in which the electronic device 202-1 and the second external electronic device 202-2 according to one embodiment transmit an audio packet to the first external electronic device 201 will be described.

FIG. 10 is a diagram 1000 for describing an operation of an electronic device according to an embodiment of the disclosure.

An electronic device 202-1 and a second external electronic device 202-2, which will be described below, may each have an established communication link related to isochronous data transmission with a first external electronic device 201. For example, as a first external electronic device 201 starts binaural recording based on a user input, the first external electronic device 201 may transmit an audio data request generated in the same time period to the electronic device 202-1 and the second external electronic device 202-2, and may establish a communication link related to isochronous data transmission with each of the electronic device 202-1 and the second external electronic device 202-2. The first external electronic device 201, the electronic device 202-1, and the second external electronic device 202-2, which will be described below, may transmit and receive data packets (e.g., audio packets) through the communication link described above. The electronic device 202-1 and the second external electronic device 202-2 may transmit, to the first external electronic device 201, audio packets that have been generated according to the operation described above with reference to FIG. 9 and into which order information (e.g., numbers from 1 to 6) is inserted. For example, audio packets with the same number inserted may be audio packets generated in the same time period.

Referring to FIG. 10, the first external electronic device 201 may transmit a data packet to the electronic device 202-1 in a first time period CIS1. For example, the first time period CIS1 may include two sub periods (e.g., CIS1 Sub_Interval in FIG. 7). The first external electronic device 201 may transmit one data packet for each sub period.

According to one embodiment, the electronic device 202-1 may transmit first audio packets 1021, 1022, 1023, 1024, 1025, and 1026 in response to receiving data packets 1001, 1002, 1005, 1006, 1009, and 1010 from the first external electronic device 201. For example, order information indicating the generation order of the first audio packets (e.g., numbers from 1 to 6) may be inserted into the first audio packets 1021, 1022, 1023, 1024, 1025, and 1026 transmitted by the electronic device 202-1 to the first external electronic device 201.

In an embodiment, the first external electronic device 201 may transmit the data packets to the second external electronic device 202-2 in a second time period CIS2. For example, the second time period CIS2 may include two sub periods (e.g., CIS2 Sub_Interval in FIG. 7). The first external electronic device 201 may transmit one data packet for each sub period.

According to another embodiment, the second external electronic device 202-2 may transmit second audio packets 1031, 1032, 1033, 1034, 1035, and 1036 in response to receiving data packets 1003, 1004, 1007, 1008, 1011, and 1012 from the first external electronic device 201. For example, order information indicating the generation order of the second audio packets (e.g., numbers from 1 to 5) may be inserted into the second audio packets 1031, 1032, 1033, 1034, 1035, and 1036 transmitted by the second external electronic device 202-2 to the first external electronic device 201. In the example illustrated in FIG. 10, the second external electronic device 202-2 may fail to transmit, to the first external electronic device 201, the second audio packet 1032 that has second generated.

According to yet another embodiment, the first time period CIS1 and the second time period CIS2 may be repeated at a specified time interval (ISO interval). According to one embodiment, the first external electronic device 201 may start a second first time period 1052 after a specified time interval (ISO interval) from a starting point in time 1041 (e.g., a first CIS1 anchor point) of the first first time period 1051. The first external electronic device 201 may transmit data packets 1005 and 1006 to the electronic device 202-1 in a second first time period 1052. According to an embodiment, the electronic device 202-1 may transmit the audio packet 1023 of the next order of the audio packet 1022 last transmitted in the first first time period 1051 in response to receiving the data packets 1005 and 1006 from the first external electronic device 201.

According to an embodiment, the first external electronic device 201 may start a second second time period 1062 after a specified time interval (ISO interval) from a starting point in time 1042 (e.g., a first CIS2 anchor point) of a first second time period 1061. The first external electronic device 201 may transmit the data packets 1007 and 1008 to the second external electronic device 202-2 in a second second time period 1062. According to another embodiment, the second external electronic device 202-2 may transmit an audio packet of the next order of the audio packet last transmitted in the first second time period 1061 in response to receiving the data packets 1007 and 1008 from the first external electronic device 201. For example, when there is an audio packet that has failed to be transmitted in the previous time period, the audio packet that has failed to be transmitted may be retransmitted in the next time period. In the example illustrated in FIG. 10, since the second external electronic device 202-2 has failed to transmit the second audio packet 1032 in the first second time period 1061, the second external electronic device 202-2 may retransmit the second audio packet 1032 in the second second time period 1062 and continue to transmit the third audio packet 1033 of the next order. In another example, when there is an audio packet that has failed to be transmitted in the previous time period, the audio packet that has failed to be transmitted may not be retransmitted, and transmission may be performed starting from the audio packet of the next order of the audio packet that has failed to be transmitted in the next time period. After failing to transmit the second audio packet 1032 in the first second time period 1061, the second external electronic device 202-2 may first transmit the third audio packet 1033 in the second second time period 1062.

In an embodiment, the above-described contents may be applied to data transmission and reception in the third first time period 1053 and the third second time period 1063 in the same or similar manner.

According to the embodiment shown in FIG. 10, the first external electronic device 201 may not receive, in the same ISO interval, even the audio packets generated by the electronic device 202-1 and the second external electronic device 202-2 using the audio data acquired in the same time period through the respective microphones. Although not illustrated in FIG. 10, for another example, the first external electronic device 201 may not receive at least one of the audio packets generated by the electronic device 202-1 and the second external electronic device 202-2 using audio data acquired in the same time period even within the entire ISO interval. The first external electronic device 201 may identify and compare the generation order of the first audio packet generated by the electronic device 202-1 and the generation order of the second audio packet generated by the second external electronic device 202-2 based on information (e.g., the order information) inserted into the received audio packets, regardless of the time when audio packets are received or whether or not there are audio packets missed. For example, the first external electronic device 201 may identify that the first and second audio packets received in different ISO intervals are audio packets generated in the same time period based on the fact that the numbers inserted into the first audio packet and the second audio packet are the same.

An operation of an electronic device according to an embodiment will be described with reference to FIG. 11.

FIG. 11 is a flowchart 1100 illustrating operations of an electronic device according to an embodiment of the disclosure.

Operations of the electronic device described below may be performed by the electronic device 202-1 in FIG. 2. Operations of a first external electronic device, which will be described below, may be performed by the first external electronic device 201 in FIG. 2. Operations of a second external electronic device, which will be described below, may be performed by the second external electronic device 202-2 in FIG. 2.

In operation 1101, the electronic device may receive an audio data request from the first external electronic device. According to an embodiment, the electronic device may receive the audio data request from the first external electronic device through a communication circuit (e.g., the communication circuit 351 in FIG. 3). According to another embodiment, the communication circuit may establish a Bluetooth low energy (BLE) communication link with the first external electronic device. According to one embodiment, the communication circuit may establish a BLE communication link with the second external electronic device. The communication method of the electronic device with the first external electronic device and the second external electronic device is not limited to the BLE method and may include the Bluetooth classic method.

In one embodiment, the audio data request may be transmitted from the first external electronic device to the electronic device and the second external electronic device as the first external electronic device starts binaural recording.

As for the communication link establishment of the electronic device with the external electronic devices and the audio data request received by the electronic device, the contents described above with reference to FIGS. 1 to 8 may be applied in the same way, and thus redundant descriptions thereof will be omitted or simplified.

In operation 1103, the electronic device may generate a first audio packet based on a specified condition. According to one embodiment, the electronic device may generate the first audio data using audio data acquired through a microphone (e.g., the microphone 361 in FIG. 3) in the same time period as the second external electronic device connected to the communication circuit based on the specified condition. According to another embodiment, the specified condition may include a specified time according to a clock of the first external electronic device of a first communication link (e.g., the first link 205 in FIG. 3) between the electronic device and the first external electronic device. According to yet another embodiment, the specified condition may include a specified time according to an event count of a second communication link (e.g., the third link 215 in FIG. 3) between the electronic device and the second external electronic device or reference clock of the second communication link. According to still another embodiment, the specified condition may include a specified time according to an event count or timing parameter associated with isochronous data transmission between the electronic device and the first external electronic device.

According to an embodiment, the electronic device may generate the first audio packet using audio data acquired through the microphone from a specified first point in time to a specified second point in time according to the specified condition. The electronic device may acquire a plurality of first audio packets by generating the first audio packet at a period specified according to a specified condition.

The contents described above with reference to FIGS. 3 to 9 may be applied to the method of generating audio packets based on the specified condition by the electronic device, the clock (or the reference clock), event count, and timing parameter related to the specified condition in the same manner, and thus redundant descriptions thereof will be omitted or simplified.

In operation 1105, the electronic device may insert, into the first audio packet, information for comparing the first audio packet with the second audio packet generated by the second external electronic device in terms of generation order. According to one embodiment, the second audio packet may include an audio packet generated using the audio data acquired through the microphone (e.g., the microphone 362 in FIG. 3) of the second external electronic device from a specified first point in time to a specified second point in time according to the specified condition. The electronic device may insert time information including at least one of the specified first point in time or the specified second point in time and order information corresponding to the time information into the first audio packet. According to one embodiment, the time information and the order information may be equally inserted into the audio packet generated using the audio data acquired through the microphone of the second external electronic device from the specified first point in time to the specified second point in time.

The electronic device may insert, into the plurality of first audio packets, the order information including a larger number as a point in time included in the time information about each of the plurality of first audio packets becomes later.

According to one embodiment, the electronic device may insert the order information into only one of one or more first audio packets having time information with the same specified time unit among the plurality of first audio packets. One first audio packet into which order information is inserted may be, for example, an audio packet having time information indicating the earliest time among one or more first audio packets having time information with the same specified time unit.

The method of inserting, into the first audio packet, information for comparing the first audio packet with the second audio packet in terms of generation order by the electronic device, the time information, and the sequence information are the same as those described above with reference to FIGS. 3 to 9, and thus redundant descriptions thereof will be omitted or simplified.

In operation 1107, the electronic device may transmit the first audio packet to the first external electronic device. The electronic device may transmit, to the first external electronic device, an audio packet into which information for comparing the audio packet with the second audio packet in terms of generation order is input, through the communication circuit.

As for the method of transmitting the first audio packet to the first external electronic device by the electronic device, the contents described above with reference to FIGS. 3 to 8 and 10 may be applied in the same way, and thus redundant descriptions thereof will be omitted or simplified.

According to one embodiment, an electronic device (e.g., the second electronic device 202-1 in FIG. 2, the electronic device 202-1 in FIG. 3, the electronic device 202-1 in FIG. 4, the electronic device 202-1 in FIG. 9, or the electronic device 202-1 in FIG. 10) may include a microphone (e.g., the microphone 361 in FIG. 3), a communication circuit (e.g., the communication circuit 351 in FIG. 3), memory (e.g., the memory 371 in FIG. 3), and a processor (e.g., the processor 381 in FIG. 3) operatively connected to the microphone, the communication circuit, and the memory, and the memory may store one or more instructions, when executed by the processor, cause the electronic device to receive an audio data request from a first external electronic device (e.g., the first electronic device 201 in FIG. 2, the first external electronic device 201 in FIG. 3, or the first external electronic device 201 in FIG. 10) through the communication circuit, generate a first audio packet using audio data acquired through the microphone in the same time period as a second external electronic device (e.g., the third electronic device 202-2 in FIG. 2, the second external electronic device 202-2 in FIG. 3, the electronic device 202-1 in FIG. 4, the second external electronic device 202-2 in FIG. 9, or the second external electronic device 202-2 in FIG. 10) connected through the communication circuit, based on a specified condition, insert, into the first audio packet, information for comparing the first audio packet with a second audio packet generated by the second external electronic device in terms of generation order, and transmit the first audio packet to the first external electronic device through the communication circuit.

According to one embodiment, the specified condition may include a specified time according to a clock of the first external electronic device of a first communication link (e.g., the first link 205 in FIG. 2 or the first link 205 in FIG. 3) between the electronic device and the first external electronic device.

According to one embodiment, the specified condition may include a specified time according to an event count of a second communication link (e.g., the third link 215 in FIG. 2 or the third link 215 in FIG. 3) between the electronic device and the second external electronic device or a reference clock of the second communication link.

The specified condition may include a specified time according to an event count or timing parameter associated with isochronous data transmission between the electronic device and the first external electronic device.

According to one embodiment disclosed herein, the instructions, when executed by the processor, may cause the electronic device to generate the first audio packet using audio data acquired through the microphone from a specified first point in time to a specified second point in time according to the specified condition, and the second audio packet may include an audio packet generated using audio data acquired through a microphone of the second external electronic device from the specified first point in time to the specified second point in time.

According to another embodiment disclosed herein, the instructions, when executed by the processor, may cause the electronic device to insert time information including at least one of the specified first point in time or the specified second point in time and order information corresponding to the time information into the first audio packet, and the time information and the order information may be equally inserted into the audio packet generated using the audio data acquired through the microphone of the second external electronic device from the specified first point in time to the specified second point in time.

According to yet another embodiment disclosed herein, the instructions, when executed by the processor, may cause the electronic device to acquire a plurality of first audio packets by generating the first audio packet at a specified period according to a specified condition and insert, into the plurality of first audio packets, the order information including a larger number as a point in time included in the time information about each of the plurality of first audio packets becomes later.

The instructions, when executed by the processor, may cause the electronic device to acquire a plurality of first audio packets by generating the first audio packet at a specified period according to a specified condition, and insert the order information into only one of one or more first audio packets having the time information with the same specified time unit among the plurality of first audio packets.

According to one embodiment disclosed herein, the communication circuit may establish a Bluetooth low energy (BLE) communication link with the first external electronic device.

The audio data request may be transmitted from the first external electronic device to the electronic device and the second external electronic device as the first external electronic device starts binaural recording.

An operation method of an electronic device (e.g., the second electronic device 202-1 in FIG. 2, the electronic device 202-1 in FIG. 3, the electronic device 202-1 in FIG. 4, the electronic device 202-1 in FIG. 9, or the electronic device 202-1 in FIG. 10) may include receiving an audio data request from a first external electronic device (e.g., the first electronic device 201 in FIG. 2, the first external electronic device 201 in FIG. 3, or the first external electronic device 201 in FIG. 10) through a communication circuit (e.g., the communication circuit 351 in FIG. 3), generating a first audio packet using audio data acquired through a microphone (e.g., the microphone 361 in FIG. 3) in the same time period as a second external electronic device (e.g., the third electronic device 202-2 in FIG. 2, the second external electronic device 202-2 in FIG. 3, the electronic device 202-1 in FIG. 4, the second external electronic device 202-2 in FIG. 9, or the second external electronic device 202-2 in FIG. 10) connected through the communication circuit, based on a specified condition, inserting, into the first audio packet, information for comparing the first audio packet with a second audio packet generated by the second external electronic device in terms of generation order, and transmitting the first audio packet to the first external electronic device through the communication circuit.

According to one embodiment disclosed herein, the specified condition may include a specified time according to a clock of the first external electronic device of a first communication link (e.g., the first link 205 in FIG. 2 or the first link 205 in FIG. 3) between the electronic device and the first external electronic device.

The specified condition may include a specified time according to an event count of a second communication link (e.g., the third link 215 in FIG. 2 or the third link 215 in FIG. 3) between the electronic device and the second external electronic device or a reference clock of the second communication link.

According to another embodiment disclosed herein, the specified condition may include a specified time according to an event count or timing parameter associated with isochronous data transmission between the electronic device and the first external electronic device.

According to one embodiment, the method may further include generating the first audio packet using audio data acquired through the microphone from a specified first point in time to a specified second point in time according to the specified condition, and the second audio packet may include an audio packet generated using audio data acquired through a microphone of the second external electronic device from the specified first point in time to the specified second point in time.

According to one embodiment, the method may further include inserting time information including at least one of the specified first point in time or the specified second point in time and order information corresponding to the time information into the first audio packet, and the time information and the order information may be equally inserted into the audio packet generated using the audio data acquired through the microphone of the second external electronic device from the specified first point in time to the specified second point in time.

According to yet another embodiment disclosed herein, the method may further include acquiring a plurality of first audio packets by generating the first audio packet at a specified period according to a specified condition, and inserting, into the plurality of first audio packets, the order information including a larger number as a point in time included in the time information about each of the plurality of first audio packets becomes later.

According to one embodiment disclosed herein, the method may further include acquiring a plurality of first audio packets by generating the first audio packet at a specified period according to a specified condition, and inserting the order information into only one of one or more first audio packets having the time information with the same specified time unit among the plurality of first audio packets.

According to still another embodiment disclosed herein, the communication circuit may establish a Bluetooth low energy (BLE) communication link with the first external electronic device.

According to one embodiment disclosed herein, the audio data request may be transmitted from the first external electronic device to the electronic device and the second external electronic device as the first external electronic device starts binaural recording.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a microphone;

a communication circuit;

memory storing one or more computer programs; and one or more processors communicatively coupled to the microphone, the communication circuit, and the memory, wherein the one or more computer programs include computer-executable instructions that, when executed by the one or more processors, cause the electronic device to:

receive an audio data request from a first external electronic device through the communication circuit, generate a first audio packet using audio data acquired through the microphone in the same time period as a second external electronic device connected through the communication circuit, based on a specified condition, insert, into the first audio packet, information for comparing the first audio packet with a second audio packet generated by the second external electronic device in terms of generation order, and transmit the first audio packet to the first external electronic device through the communication circuit, and wherein the information for comparing includes time information and order information, the time information about a time in which the electronic device generates the first audio packet, or a time in which the electronic device acquires audio data corresponding to the first audio packet, and the order information about an order in which the electronic device generates the first audio packet, or an order in which the electronic device acquires audio data corresponding to the first audio packet.

2. The electronic device of claim 1, wherein the specified condition includes a specified time according to a clock of the first external electronic device of a first communication link between the electronic device and the first external electronic device.

3. The electronic device of claim 1, wherein the specified condition includes a specified time according to an event count of a second communication link between the electronic device and the second external electronic device or a reference clock of the second communication link.

4. The electronic device of claim 1, wherein the specified condition includes a specified time according to an event count or timing parameter associated with isochronous data transmission between the electronic device and the first external electronic device.

5. The electronic device of claim 1, wherein the one or more computer programs further include computer-executable instructions that, when executed by the one or more processors, cause the electronic device to generate the first audio packet using audio data acquired through the microphone from a specified first point in time to a specified second point in time according to the specified condition, and wherein the second audio packet includes an audio packet generated using audio data acquired through a microphone of the second external electronic device from the specified first point in time to the specified second point in time.

6. The electronic device of claim 5, wherein the one or more computer programs further include computer-executable instructions that, when executed by the one or more processors, cause the electronic device to insert time information including at least one of the specified first point in time or the specified second point in time and order information corresponding to the time information into the first audio packet, and wherein the time information and the order information are equally inserted into the audio packet generated using the audio data acquired through the microphone of the second external electronic device from the specified first point in time to the specified second point in time.

7. The electronic device of claim 6, wherein the one or more computer programs further include computer-executable instructions that, when executed by the one or more processors, cause the electronic device to:

acquire a plurality of first audio packets by generating the first audio packet at a specified period according to a specified condition; and insert, into the plurality of first audio packets, the order information including a numerical value that becomes larger as a point in time included in the time information of each of the plurality of first audio packets becomes later.

8. The electronic device of claim 6, wherein the one or more computer programs further include computer-executable instructions that, when executed by the one or more processors, cause the electronic device to:

acquire a plurality of first audio packets by generating the first audio packet at a specified period according to a specified condition; and insert the order information into only one of one or more first audio packets having the time information with the same specified time unit among the plurality of first audio packets.

9. The electronic device of claim 1, wherein the audio data request is transmitted from the first external electronic device to the electronic device and the second external electronic device as the first external electronic device starts binaural recording.

10. A method of operating an electronic device, the method comprising:

receiving an audio data request from a first external electronic device through a communication circuit;

generating a first audio packet using audio data acquired through a microphone in the same time period as a second external electronic device connected through the communication circuit, based on a specified condition;

inserting, into the first audio packet, information for comparing the first audio packet with a second audio packet generated by the second external electronic device in terms of generation order; and transmitting the first audio packet to the first external electronic device through the communication circuit, wherein the information for comparing includes time information and order information, the time information about a time in which the electronic device generates the first audio packet, or a time in which the electronic device acquires audio data corresponding to the first audio packet, and the order information about an order in which the electronic device generates the first audio packet, or an order in which the electronic device acquires audio data corresponding to the first audio packet.

11. The method of claim 10, wherein the specified condition includes a specified time according to a clock of the first external electronic device of a first communication link between the electronic device and the first external electronic device.

12. The method of claim 10, wherein the specified condition includes a specified time according to an event count of a second communication link between the electronic device and the second external electronic device or a reference clock of the second communication link.

13. The method of claim 10, wherein the specified condition includes a specified time according to an event count or timing parameter associated with isochronous data transmission between the electronic device and the first external electronic device.

14. The method of claim 10, further comprising:

generating the first audio packet using audio data acquired through the microphone from a specified first point in time to a specified second point in time according to the specified condition, wherein the second audio packet includes an audio packet generated using audio data acquired through a microphone of the second external electronic device from the specified first point in time to the specified second point in time.

15. The method of claim 14, further comprising:

inserting time information including at least one of the specified first point in time or the specified second point in time and order information corresponding to the time information into the first audio packet, wherein the time information and the order information are equally inserted into the audio packet generated using the audio data acquired through the microphone of the second external electronic device from the specified first point in time to the specified second point in time.

16. The method of claim 15, further comprising:

acquiring a plurality of first audio packets by generating the first audio packet at a specified period according to a specified condition; and inserting, into the plurality of first audio packets, the order information including a numerical value that becomes larger as a point in time included in the time information of each of the plurality of first audio packets becomes later.

17. The method of claim 15, further comprising:

acquiring a plurality of first audio packets by generating the first audio packet at a specified period according to a specified condition; and inserting the order information into only one of one or more first audio packets having the time information with the same specified time unit among the plurality of first audio packets.

18. The method of claim 10, wherein the audio data request is transmitted from the first external electronic device to the electronic device and the second external electronic device as the first external electronic device starts binaural recording.

19. One or more non-transitory computer-readable storage media storing one or more computer programs including computer-executable instructions that, when executed by one or more processors of an electronic device, cause the electronic device to perform operations, the operations comprising:

receiving an audio data request from a first external electronic device through a communication circuit;

generating a first audio packet using audio data acquired through a microphone in the same time period as a second external electronic device connected through the communication circuit, based on a specified condition;

inserting, into the first audio packet, information for comparing the first audio packet with a second audio packet generated by the second external electronic device in terms of generation order; and transmitting the first audio packet to the first external electronic device through the communication circuit, wherein the information for comparing includes time information and order information, the time information about a time in which the electronic device generates the first audio packet, or a time in which the electronic device acquires audio data corresponding to the first audio packet, and the order information about an order in which the electronic device generates the first audio packet, or an order in which the electronic device acquires audio data corresponding to the first audio packet.

20. The one or more non-transitory computer-readable storage media of claim 19, wherein communication circuit generates a Bluetooth low energy (BLE) communication link with the first external electronic device.

* * * * *